(12) United States Patent
Kuwa et al.

(10) Patent No.: US 6,624,952 B2
(45) Date of Patent: Sep. 23, 2003

(54) PROJECTION OPTICAL SYSTEM

(75) Inventors: Tomiei Kuwa, Osaka (JP); Soh Ohzawa, Toyonaka (JP); Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/178,205

(22) Filed: Jun. 24, 2002

(65) Prior Publication Data

US 2003/0137744 A1 Jul. 24, 2003

(30) Foreign Application Priority Data

Jun. 28, 2001 (JP) ....................................... 2001-196884

(51) Int. Cl.⁷ .............................................. G02B 27/18
(52) U.S. Cl. ...................... 359/726; 359/649; 353/31; 353/37; 353/98
(58) Field of Search ................................. 359/726, 732, 359/733, 734, 735, 736, 649, 650, 651; 353/30, 31, 37, 98

(56) References Cited

U.S. PATENT DOCUMENTS

| | | | |
|---|---|---|---|
| 5,973,848 A | 10/1999 | Taguchi et al. | 359/651 |
| 6,091,550 A * | 7/2000 | Hayashi et al. | 359/649 |
| 6,144,503 A | 11/2000 | Sugano | 359/749 |
| 6,188,522 B1 * | 2/2001 | Kimura et al. | 359/649 |
| 6,188,523 B1 * | 2/2001 | Choi | 359/649 |
| 6,315,415 B1 * | 11/2001 | Hayashi et al. | 353/98 |

FOREIGN PATENT DOCUMENTS

JP 2001-042211 A 2/2001

* cited by examiner

Primary Examiner—Scott J. Sugarman
Assistant Examiner—Deborah Raizen
(74) Attorney, Agent, or Firm—Sidley Austin Brown & Wood LLP

(57) ABSTRACT

A projection optical system projects an enlarged image of a light valve image onto a screen. The system has, from the conjugate enlargement side: a negative front lens unit, optical path turning means (including a reflecting surface), a positive rear lens unit, and projection light preparing means, which can separate illumination and projection light, or can integrate light of different colors, or can do both. Each of the front and rear lens units includes at least one aspherical surface. The front lens unit has a negative first lens element at its conjugate-enlargement end and a negative second lens element at the conjugate reduction side of the first lens element. The rear lens unit includes a positive third lens element made of an anomalous dispersion material. The center of the light valve is not located on the optical axis of the rear lens unit.

25 Claims, 21 Drawing Sheets

Spherical Aberration

Astigmation Aberration

Distortion

Lateral Chromatic

FIG.13A
FIG.13B
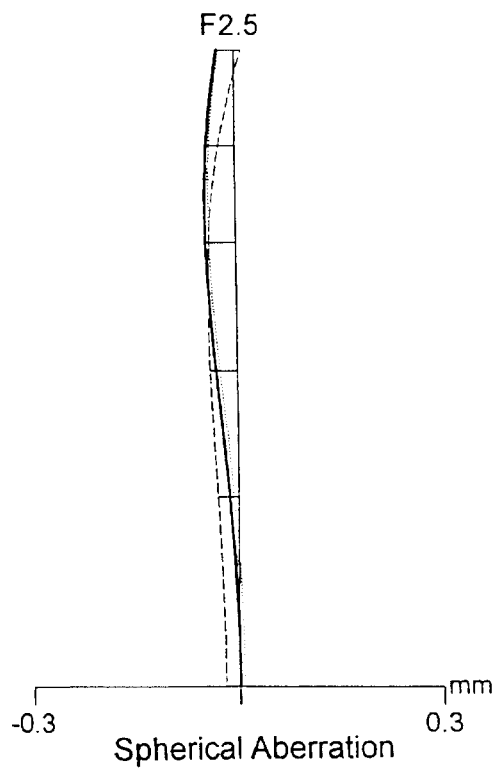
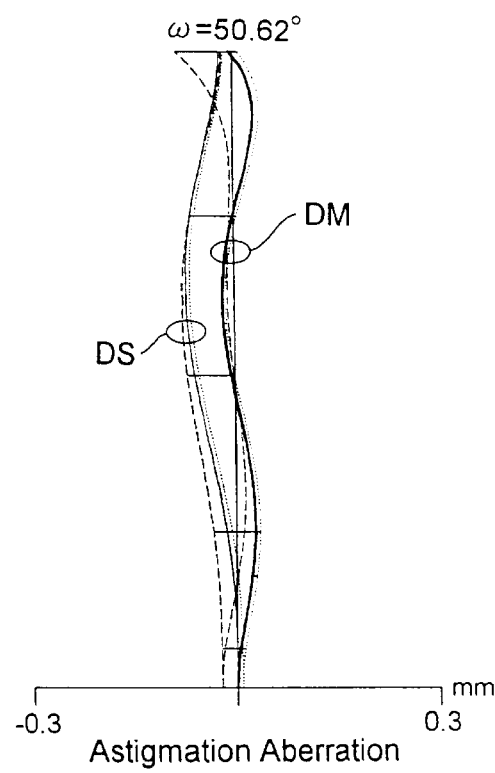
FIG.13C
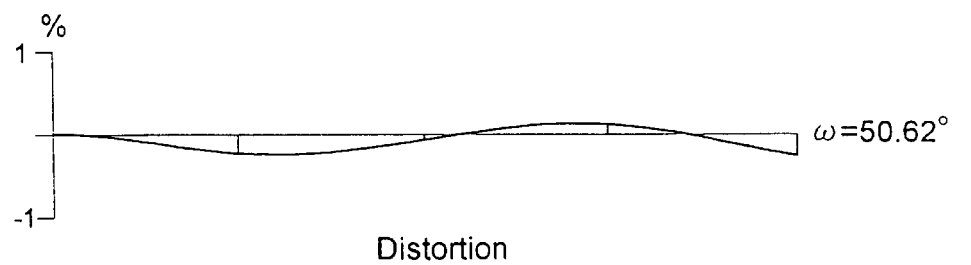
FIG.13D
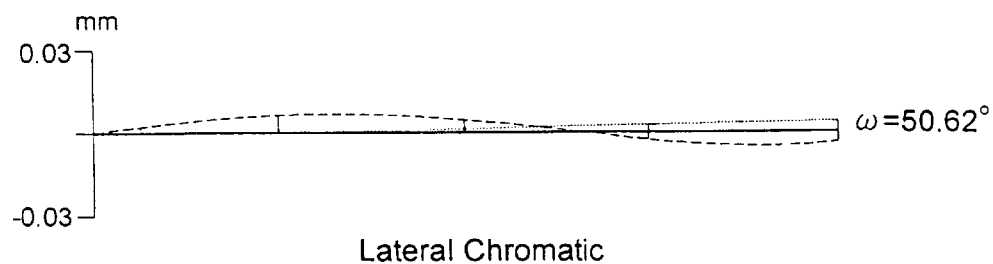

Spherical Aberration

Astigmation Aberration

Distortion

Lateral Chromatic

Spherical Aberration

Astigmation Aberration

Distortion

Lateral Chromatic

F2.8

Spherical Aberration
-0.3 to 0.3 mm

ω=50°

DS, DM

Astigmation Aberration
-0.3 to 0.3 mm

ω=50°

Distortion

ω=50°

Lateral Chromatic

Spherical Aberration

Astigmation Aberration

Distortion

Lateral Chromatic

F2.5

Spherical Aberration (-0.3 to 0.3 mm)

ω=50.44°

DM, DS

Astigmation Aberration (-0.3 to 0.3 mm)

Distortion, ω=50.44°

Lateral Chromatic, ω=50.44°

Spherical Aberration

Astigmation Aberration

Distortion

Lateral Chromatic

PROJECTION OPTICAL SYSTEM

This application is based on Japanese Patent Application No. 2001-196884 filed on Jun. 28, 2001, the contents of which are hereby incorporated by reference.

BACKGROUND OF THE INVENTION

1. Field of the Invention

The present invention relates to a projection optical system, and more particularly to a projection optical system suitable for use in a rear projection apparatus for projecting an enlarged image of an image displayed on, for example, a light valve (such as a liquid crystal panel) onto a screen.

2. Description of the Prior Art

Conventionally, there are known rear projection apparatus that project an image displayed on a small-size light valve onto a screen by the use of a projection optical system, and there has been increasing demand for more light-weight and compact models of such projection apparatus. However, making a projection apparatus light-weight makes it impossible to greatly increase the number of lens elements used in it, and making a projection apparatus compact requires giving its projection optical system a wider angle of view, which makes it difficult to satisfactorily correct various aberrations (in particular, chromatic aberration and distortion). For these reasons, such a projection optical system needs to have an appropriately designed optical construction. Moreover, variations in the temperature inside the apparatus caused by illumination light degrade optical performance, and therefore the focal lengths of the individual lens elements and their arrangement need to be determined with consideration given to the temperature properties of lens materials.

By using a retrofocus-type projection optical system having a wide angle of view and a long back focal length, and turning its optical path midway, it is possible to reduce the thickness of a rear projection apparatus in its depth direction. As projection optical systems having an optical path turned midway, various types have been proposed that are composed of a front lens unit and a rear lens unit. Here, the front lens unit starts with, from the conjugate enlargement side, a first and a second lens element both negative, includes an aspherical surface, and has a negative optical power as a whole; the rear lens unit includes an aspherical surface, and has a positive optical power as a whole. Examples of projection optical systems constructed in this way are disclosed in U.S Pat. No. 5,973,848, Japanese Patent Application Laid-Open No. 2001-42211, and U.S Pat. No. 6,144,503.

However, the conventional examples mentioned above have the following disadvantages. An attempt to give them a wider angle of view makes it impossible to satisfactorily correct chromatic aberration with as few lens elements as possible. Variations in temperature cause great variations in their back focal length. In particular, in the projection optical systems disclosed in U.S Pat. No. 5,973,848 and Japanese Patent Application Laid-Open No. 2001-42211, making the angle of view wider makes it impossible to secure sufficient space to permit the optical path to be turned at an acute angle. Thus, these constructions: are unsuitable to reduce the thickness of a rear projection apparatus in the depth direction or reduce the protrusion below the screen. On the other hand, the projection optical systems disclosed in U.S Pat. No. 6,144,503 is not telecentric at the conjugate reduction Side. Thus, using a prism or the like that separates or integrates optical paths in it leads to low contrast, uneven colors, uneven brightness, and the like. This makes it difficult to obtain satisfactory images.

SUMMARY OF THE INVENTION

An object of the present invention is to provide a light-weight, compact projection optical system that offers a wide angle of view and high performance and that produces high-resolution images.

To achieve the above object, according to one aspect of the present invention, a projection optical system that, by using projection light emanating from a light valve illuminated by illumination light, projects an enlarged image of an image displayed on the light valve onto a screen is provided with, from the conjugate enlargement side: a front lens unit having a negative optical power as a whole, including at least one aspherical surface, having a first lens element having a negative optical power disposed at the conjugate-enlargement-side end thereof, and having a second lens element having a negative optical power disposed on the conjugate reduction side of the first lens element; optical path turning means, including a reflecting surface, for turning the light path of the light emanating from the front lens unit; a rear lens unit having a positive optical power as a whole, including at least one aspherical surface, and including a third lens element made of an anomalous dispersion material and having a positive optical power; and projection light preparing means disposed between the rear lens unit and the light valve and having at least one of the function of separating the illumination light and the projection light and the function of integrating together light of different colors. Here, the center of the light valve is not located on the optical axis of the rear lens unit. Moreover, the following conditions are fulfilled:

$$48 < \omega < 60 \tag{1}$$

$$3 < D1/f < 7 \tag{2}$$

$$Vd > 75 \tag{3}$$

$$0.52 < (Ng-Nf)/(Nf-Nc) < 0.56 \tag{4}$$

where

ω represents the maximum angle of view (°);
D1 represents the turning aerial interval (the optical path length, as converted on an air basis, from the most conjugate-reduction-side surface of the front lens unit to the most conjugate-enlargement-side surface of the rear lens unit);
f represents the focal length of the entire projection optical system;
Vd represents the Abbe number of the anomalous dispersion material;
Ng represents the refractive index of the anomalous dispersion material for the g-line;
Nf represents the refractive index of the anomalous dispersion material for the f-line; and
Nc represents the refractive index of the anomalous dispersion material for the c-line.

According to another aspect of the present invention, a projection optical system that, by using projection light emanating from a light valve illuminated by illumination light, projects an enlarged image of an image displayed on the light valve onto a screen, is provided with, from a conjugate enlargement side: a front lens unit having a negative optical power as a whole, including at least one aspherical surface, having a first lens element having a negative optical power disposed at the conjugate-enlargement-side end thereof and having a second lens element having a negative optical power disposed on the conjugate reduction side of the first lens element, optical path turning means, including a reflecting surface, for turning the light path of the light emanating from the front lens unit; a rear lens unit having a positive optical power as a whole and including at least one aspherical surface; and projection light preparing means disposed between the rear lens unit and the light valve and having at least one of the function of separating the illumination light and the projection light and the function of integrating together light of different colors. Here, the center of the light valve is not located on the optical axis of the rear lens unit. Moreover, the following conditions are fulfilled:

$$48<\omega<60 \quad (1)$$

$$3<D1/f<7 \quad (2)$$

$$-0.5<-ffa/fra<0.5 \quad (5)$$

where

| | |
|---|---|
| ω | represents the maximum angle of view (°); |
| D1 | represents the turning aerial interval (the optical path length, as converted on an air basis, from the most conjugate-reduction-side surface of the front lens unit to the most conjugate-enlargement-side surface of the rear lens unit); |
| f | represents the focal length of the entire projection optical system; |
| ffa | represents the focal length of the lens element having the aspherical surface included in the front lens unit; and |
| fra | represents the focal length of the lens element having the aspherical surface included in the rear lens unit. |

According to still another aspect of the present invention, a rear projection apparatus is provided with: a light valve for displaying an image; a screen onto which the image displayed on the light valve is projected from behind; and a projection optical system that projects an enlarged, image of the image displayed on the light valve onto the screen. Here, the projection optical system is constructed as described above.

BRIEF DESCRIPTION OF THE DRAWINGS

This and other objects and features of the present invention will become clear from the following description, taken in conjunction with the preferred embodiments with reference to the accompanying drawings in which:

FIGS. 13A to 13D are aberration diagrams of Example 2;

DESCRIPTION OF THE PREFERRED EMBODIMENTS

Figure 5:
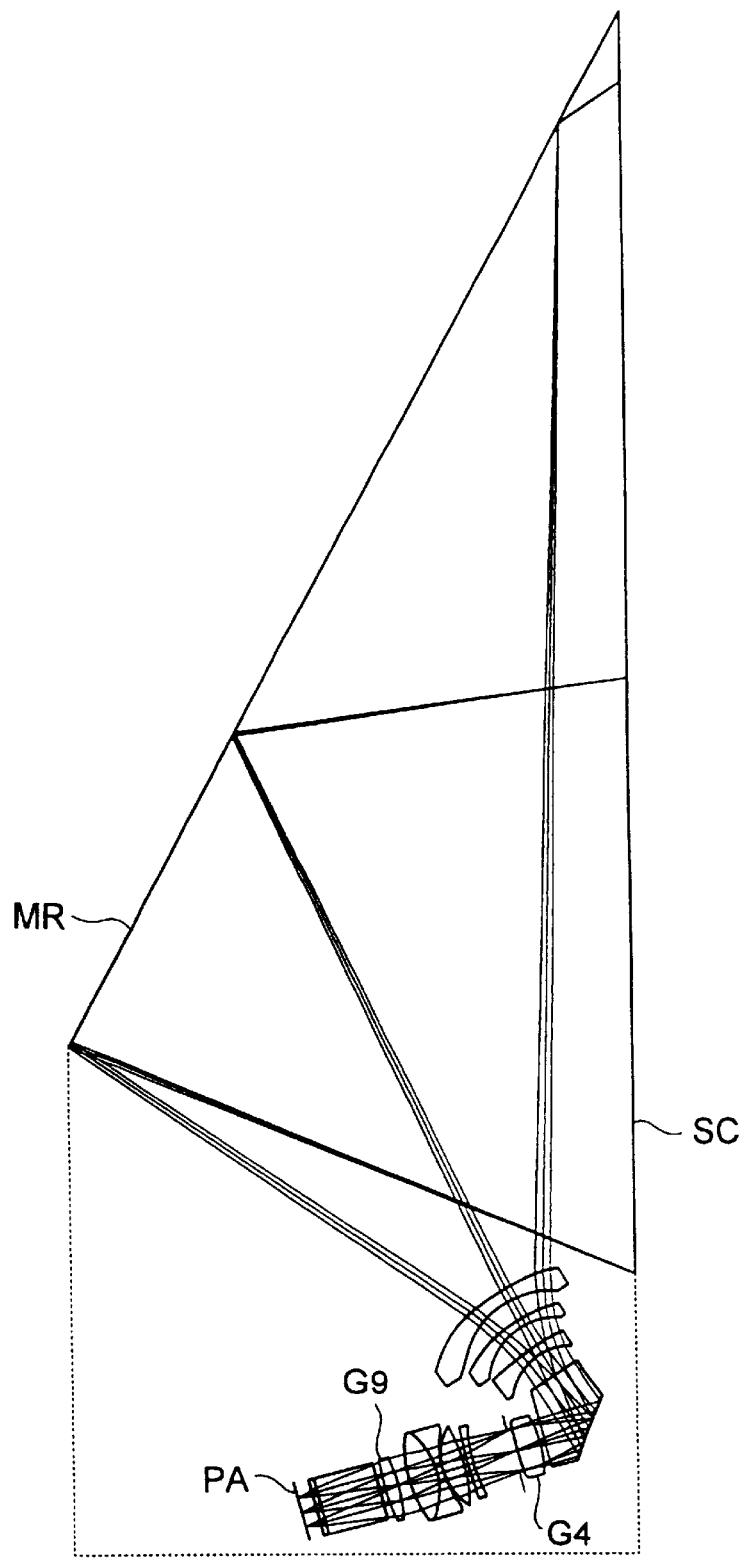
FIG. 5 is a sectional view showing the optical arrangement and the projection optical path of an entire rear projection apparatus (40-inch type) to which the third embodiment (Example 3) is applied.
Figure 6:
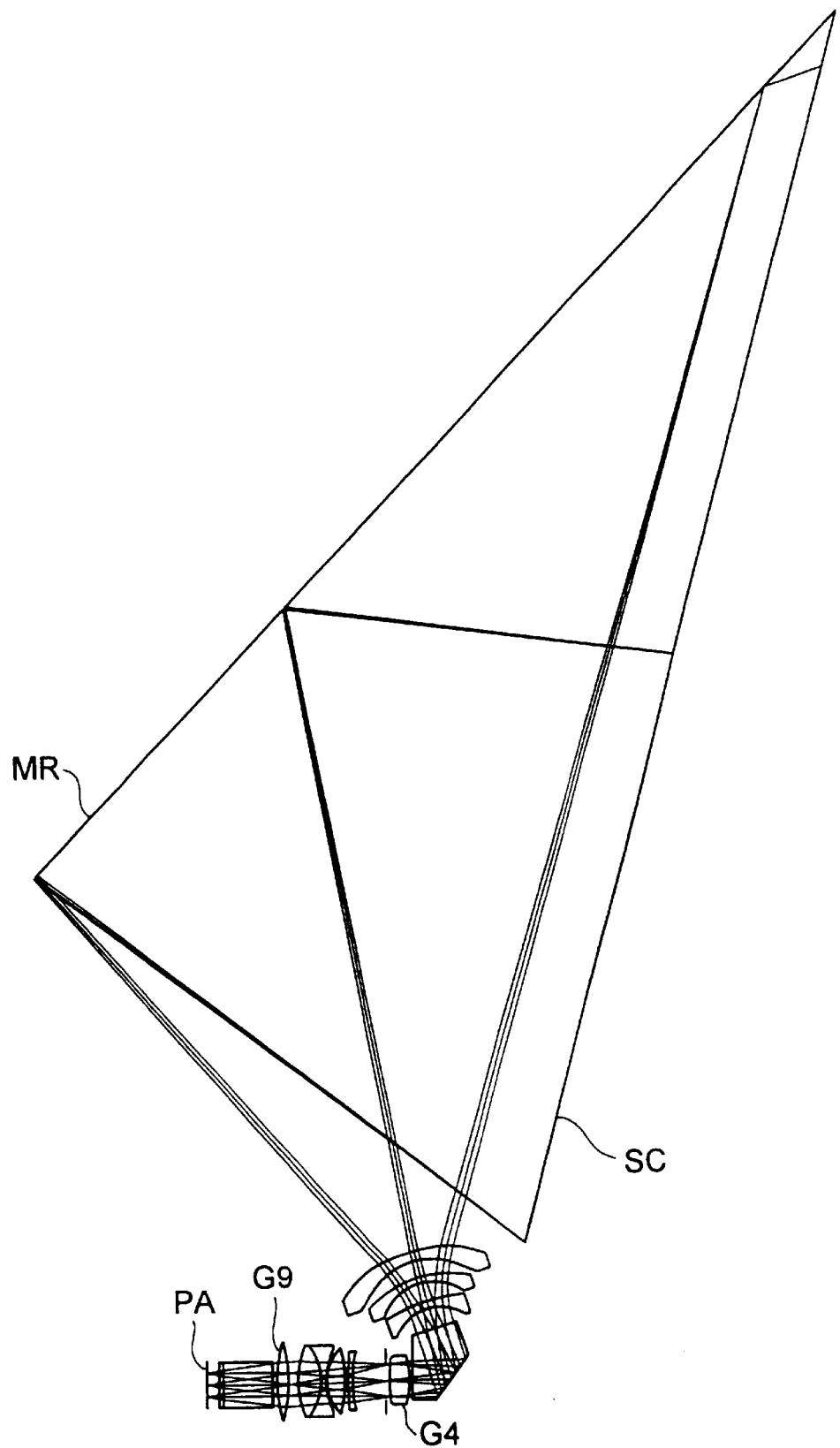
FIG. 6 is a sectional view showing the optical arrangement and the projection optical path of an entire rear projection apparatus (50-inch type) to which the third embodiment (Example 3) is applied.
Figure 7:
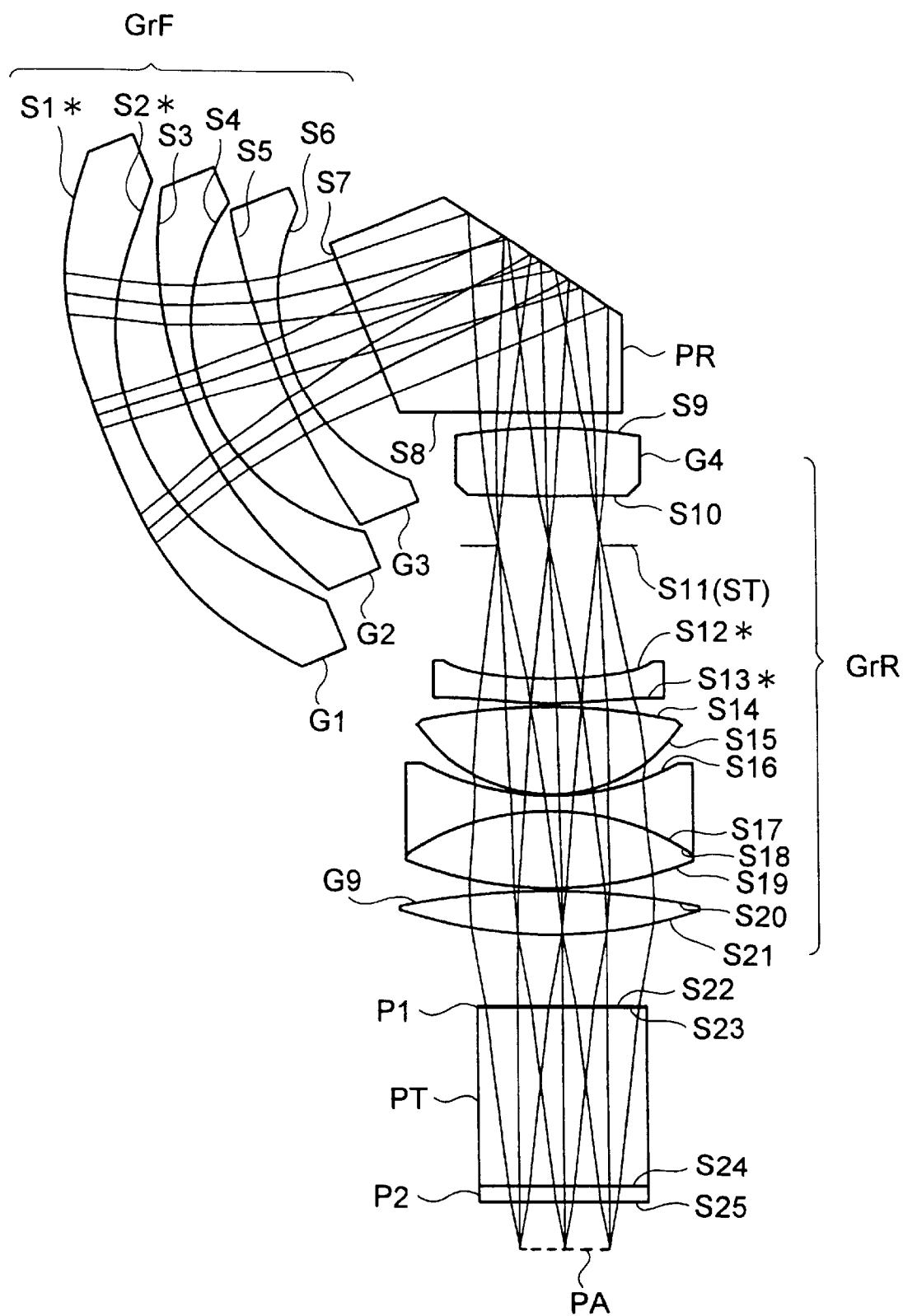
FIG. 7 is a sectional view showing the optical arrangement (40-inch type) and the projection optical path of a fourth embodiment (Example 4) of the invention.

Hereinafter, projection optical systems for rear projection according to the present invention will be described with reference to the drawings. FIGS. 1, 2, 3, 7, 8, 10, and 11 show the optical arrangement and the projection optical path of a first to a seventh embodiment of the invention, respectively. FIGS. 5 and 6 show the optical arrangement and the projection optical path of entire rear projection apparatus to which the third embodiment is applied. It is to be noted that the rear projection apparatus shown in FIG. 5 has a 40-inch screen (SC) and the rear projection apparatus shown in FIG. 6 has a 50-inch screen (SC). The overall construction of a rear projection apparatus remains substantially the same irrespective of whether the third or another embodiment of the invention is applied to it; specifically, as shown in FIGS. 5 and 6, the projection optical path is turned by a mirror (MR) between the projection optical system and the screen (SC).

In any of the first to seventh embodiments, the projection optical system is so constructed that an enlarged image of an image displayed on a light valve (PA) is projected onto the screen (SC) by projection light emanating from the light valve (PA) substantially telecentrically. The projection optical system is provided with, from the conjugate enlargement side, a front lens unit (GrF) including an aspherical surface and having a negative optical power, a prism (PR) that turns the optical path by the use of a reflecting surface and thus serves as an optical path turning means, and a rear lens unit (GrR) including an aspherical surface and having a positive optical power. Provided as a projection light preparing means (PT) between the projection optical system and the light valve (PA) is an optical path separating device for separating illumination light and projection light or an optical path integrating device for integrating optical paths together. Used as the optical path separating device is a polarization separation device, such as a PBS (polarizing beam splitter) prism or PBS sheet (for example, DBEF (trade name) manufactured by Sumitomo 3M Limited, Japan). Used as the optical path integrating device is a color integrating device that integrates together light of different colors, such as a cross dichroic prism or dichroic mirror. Used as the light valve (PA) is a display device, such as a DMD (digital micromirror device), reflective liquid crystal panel, or transmissive liquid crystal panel.

Figure 21A:
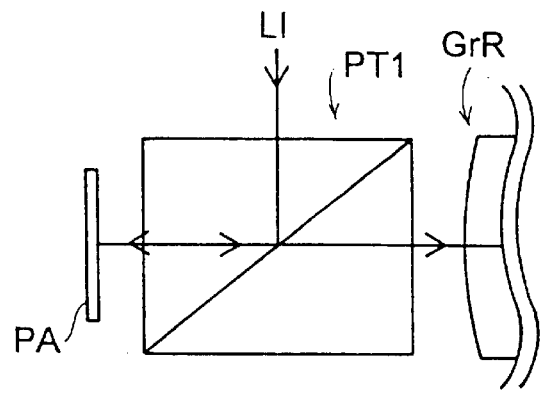
FIGS. 21A to 21C, are diagrams schematically showing practical examples of the projection light preparing means.
Figure 21B:
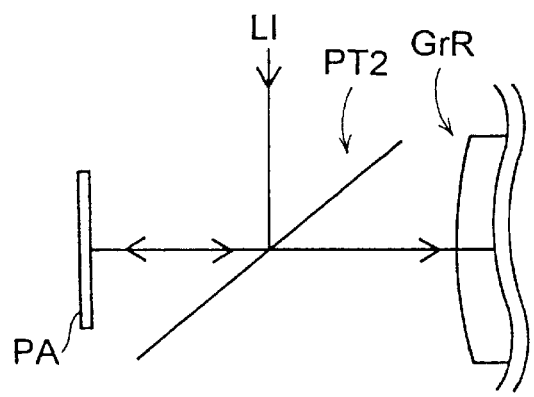
Figure 21C:
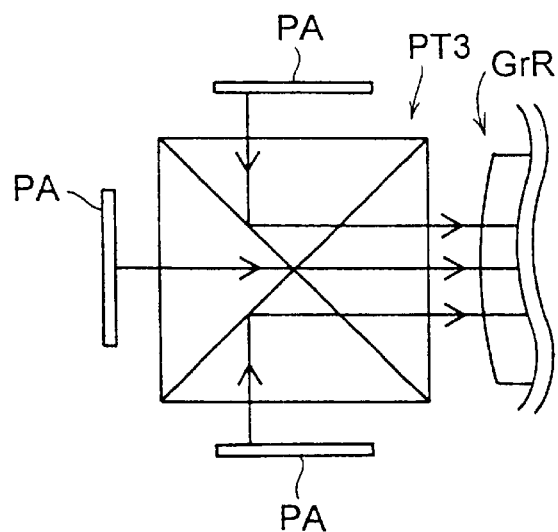

In any of the first to seventh embodiments, a PBS prism, PBS sheet, or cross dichroic prism is provided as the projection light preparing means (PT). FIGS. 21A to 21C show practical examples of the projection light preparing means (PT). FIG. 21A shows a PBS prism (PT1). The PBS prism (PT1) reflects the incident illumination light (L1) toward the light valve (PA), and transmits the light reflected from the light valve (PA) so that this light, as projection light, enters the rear lens unit (GrR). FIG. 21B shows a PBS sheet (PT2). The PBS sheet (PT2) reflects the incident illumination light (L1) toward the light valve (PA), and transmits the light reflected from the light valve (PA) so that this light, as projection light, enters the rear lens unit (GrR). FIG. 21C shows a cross dichroic prism (PT3). The cross dichroic prism (PT3) integrates together the light of different colors (for example, R, G, and B) from three light valves (PA), and makes the integrated light, as projection light, enter into the rear lens unit (GrR).

In a rear projection apparatus to which any of the first to seventh embodiments is applied, if the principal rays emanating from the light valve (PA) are not telecentric, the use of the PBS prism (PT1) or PBS sheet (PT2) aggravates the lowering of contrast, and the use of the cross dichroic prism (PT3) aggravates the unevenness of colors and of brightness. For these reasons, it is preferable to design the projection optical system to be telecentric toward the conjugate reduction side. For optimum image quality in a rear projection television set, it is further preferable that the telecentric angle (the angle θ1 of the principal rays emanating from the individual pixels of the light valve (PA) relative to a normal to the surface of the light valve (PA)) be about 20° or smaller.

In a case where a PBS prism (PT1), PBS sheet (PT2), cross dichroic prism (PT3), or the like is provided in a projection optical system having a wide angle of view, it is preferable that the projection optical system be of the retrofocus type, which tends to have a long back focal length. Accordingly, it is preferable, as in any of the first to seventh embodiments, that the projection optical system be composed of a front lens unit (GrF) having a negative optical power and a rear lens unit (GrR) having a positive optical power and that an aperture stop (ST) be placed within the rear lens unit (GrR). It is physically difficult to place the aperture stop (ST) within the space in which the optical path turning means is disposed (i.e., within the turning aerial interval between the front and rear lens units (GrF and GrR)). On the other hand, placing the aperture stop (ST) within the front lens unit (GrF) increases the total length of the front lens unit (GrF), and thus increases the protrusion of the projection optical system below the screen (SC). This is unsuitable for miniaturization.

As a space in which to insert the PBS prism (PT1), PBS sheet (PT2), cross dichroic prism (PT3), or the like, it is essential to secure a space so wide that no interference between optical paths arises at least on a sectional plane along the shorter sides of the screen. Moreover, it is preferable to secure an aerial length (the length D2, as converted on an air basis, from the most conjugate-reduction-side lens surface of the rear lens unit (GrR) to the light valve (PA) or to a condenser lens) at the conjugate-reduction-side end of the projection optical system so that the length D2 divided by the focal length (f) of the entire projection optical system is in the range from 1.6 to 4. If the value of D2/f is smaller than the lower limit of this range, unless the space is filled with a medium having a considerably high refractive index or another special construction is adopted, it is impossible to turn the optical path without interference.r By contrast, if the value of D2/f is greater than the upper limit of the range, it is impossible to obtain satisfactory optical performance.

In any of the first to seventh embodiments, of the lens elements composing the front lens unit (GrF), a first lens element (G1), which is disposed at the conjugate-enlargement-side end, and a second lens element (G2), which comes next to the first lens element (G1), both have a negative optical power. Giving the first and second lens elements (G1 and G2) of the front lens unit (GrF) negative optical powers helps reduce the volumes and diameters of those lens elements. Thus, using the negatively powered first and second lens elements (G1 and G2) is suitable to reduce the weight and costs of the projection optical system. If, in addition, at least one of the first and second lens elements (G1 and G2) has a meniscus shape convex to the enlargement side, it is possible to refract the rays gradually on the individual refractive surfaces of that lens element. This helps reduce the sensitivity of this lens element to errors. For this reason, it is further preferable that the first and second lens elements (G1 and G2) be both given a meniscus shape convex to the conjugate enlargement side.

Using an aspherical surface in the front lens unit (GrF) makes it possible to efficiently correct distortion. Thus, using an aspherical surface in the front lens unit (GrF) is effective in reducing the number of lens elements. It is preferable that the front lens unit (GrF) include a lens element having aspherical surfaces on both sides. In a projection optical system having a wide angle of view, as in any of the first to seventh embodiments, it is difficult to correct distortion, and therefore using a double-sided aspherical-surface lens element is effective for enhanced correction of distortion. It is further preferable that the double-sided aspherical surface lens element be formed as a single lens element, because then it can be molded easily out of a plastic material by injection molding or the like. Moreover, the lens elements constituting the front lens unit (GrF) have relatively large lens diameters, and therefore forming them out of plastic materials, which are generally cheaper than glass materials, helps reduce costs. For these reasons, it is preferable that the aspherical-surface lens element be disposed at the conjugate-enlargement-side end. However, giving a plastic lens element too large a diameter makes its molding and other manufacturing steps difficult, and therefore, if such a plastic lens is used, it is better disposed elsewhere than at the conjugate-enlargement-side end.

Reducing the number of lens elements constituting the front lens unit (GrF) while reducing their lens diameters results in making the curvatures of the lens surfaces sharper. A meniscus lens element convex to the conjugate enlargement side will then have a gentler curvature on the conjugate enlargement side and a sharper curvature on the conjugate reduction side. As a result, on the two surfaces of a lens element having such curvatures, the rays passing through it at its periphery are incident on those surfaces at larger incident angles. This makes anti-reflection coatings and the like less effective, and thus causes ghosts between the lens surfaces, uneven colors, uneven brightness, and the like. In particular, on a surface concave to the conjugate reduction side and having a sharp curvature, it is difficult to form a coating of uniform thickness by vapor deposition or the like, which makes the coating even less effective.

In view of this fact, it is preferable that, on a refractive surface included in the front lens unit (GrF) and, concave to the conjugate reduction side, the angle (θ2) of the tangent to the surface at the maximum effective radius relative to the optical axis of the front lens unit (GrF) be 37° or larger. Quite naturally, if there are a plurality of surfaces on which θ2=37° or around, each of them exerts a marked influence. Therefore, it is preferable that there be only one surface on which θ2=37° or around and that, on any other surface, θ2 be 45° or larger. Moreover, a plastic lens element is subject to restraints such as one prohibiting it from being heated to an extremely high temperature when coated, and therefore it is difficult to form a complex coating on it. Thus, with a plastic lens element, it is preferable that θ2 be 45° or larger.

Using an aspherical surface in the rear lens unit (GrR) makes it possible to effectively correct spherical aberration and coma, which affect image quality. Thus, using an aspherical surface in the rear lens unit (GrR) is effective in reducing the number of lens elements. It is further preferable to use a lens element having aspherical surfaces on both sides in the rear lens unit (GrR). A double-sided aspherical-surface lens element not only permits enhanced correction of aberrations, but also have other advantages such as ease of forming it as a single plastic lens element by injection molding or the like as in the front lens unit (GrF).

In any of the first to seventh embodiments, the center of the light valve (PA) is located off the optical axis of the rear lens unit (GrR). By locating the center of the light valve (PA) off the optical axis of the rear lens unit (GrR), it is possible to permit the principal ray emanating from the center of the light valve (PA) to be obliquely incident on the screen (SC). This helps reduce the thickness of the rear projection apparatus in the depth direction.

Moreover, in any of the first to seventh embodiments, the rear lens unit (GrR) includes a lens element having a positive power which is made of an anomalous dispersion material. Using a lens element made of a material that exhibits anomalous dispersion makes it possible to correct the secondary spectrum of chromatic aberration. This makes it possible to reduce the number of lens elements, in particular the number of cemented lens elements, of which the production is more complicated. Thus, using a positively powered lens element made of an anomalous dispersion material in the rear lens unit (GrR) is suitable to make the projection optical system compact and light-weight.

In any of the first to seventh embodiments, the construction of the projection optical system is given increased flexibility by the provision of an optical path turning means that turns the optical path in the middle of the projection optical system by the use of a reflecting surface. Thee increased flexibility helps reduce the depth of the rear projection apparatus and its protrusion below the screen (SC). To minimize the depth of the rear projection apparatus (SC) and: its protrusion below the screen (SC), it is preferable that the optical path turning means turns the optical axis of the front lens unit (GrF) at 90° or more (the turning angle θ3) relative to the optical axis of the rear lens unit (GrR). By contrast, in a case where a prism (PR) is used as the optical path turning means, as long as there is no need to reduce the protrusion below, it is advisable to turn all the projected rays at such angles as to fulfill the condition for total reflection inside the prism (PR), because this eliminates the need for vapor deposition and thereby helps reduce costs. For example, in the fifth embodiment (FIG. 8), the condition for total reflection inside the turning prism (PR) is fulfilled. Specifically, if the refractive index of the turning prism (PR) is Nd=1.5168, by setting the angles of all the rays of the projection light relative to a normal to the total-reflection surface to be 40.92° or larger (in the fifth embodiment, the minimum angle is 42.44°), the condition for total reflection is fulfilled.

Moreover, as in any of the first to seventh embodiments, it is preferable to insert the reflecting surface in a medium having a refractive index of 1 or higher as by using as the optical path turning means a prism (PR) having a reflecting surface coated with, for example, vapor-deposited aluminum, or silver. This is equivalent to optically reducing the turning aerial length (D1) described later, and thus helps loosen the restraints imposed on the construction of the projection optical system, leading to higher optical performance.

When the optical path turning means turns the optical path at a large angle, physical interference is more likely between the front and rear lens units (GrF and GrR) and other components. To make interference less likely, it is preferable to adopt, in a lens element that is likely to interfere in the direction perpendicular to the sectional plane on which the optical path is turned a non-circular shape by cutting off the portion of the lens element where no rays pass. For example, in the sixth embodiment (FIG. 10), to avoid interference between the front and rear lens units (GrF and GrR), the portion of the front lens unit (GrF) that interferes with the rear lens unit (GrR) is cut so as to have a shape like the letter D (D-cut). Thus, the front lens unit (GrF) is composed of non-circular lens elements.

Using non-circular lens elements to avoid interference between the rear lens unit (GrR) and an illumination system (not shown) helps shorten the back focal length of the projection optical system. On the other hand, using non-circular lens elements to avoid interference between the front lens unit (GrF) and the screen (SC) or the like helps reduce the thickness of the rear projection apparatus in the depth direction. For example, in the third embodiment (FIG. 5), to avoid interference between the front lens unit (GrF) and the screen (SC), the portion of the front lens unit (GrF) that interferes with the screen (SC) is D-cut; moreover, to avoid interference between the last lens element of the rear lens unit (CTRR) and a condenser lens (not shown) of the illumination system, the portion of the last lens element of the rear lens unit (GrR) that interferes with the condenser lens of the illumination system is D-cut. In addition, using non-circular lens elements helps save their materials, and thus leads to environment saving and cost reduction. For these reasons, even in cases where no physical interference arises, it is preferable to adopt non-circular shapes in the lens elements provided in the projection optical system which have relatively large diameters, such as the first and second lens elements (G1 and G2).

With respect to the angle of view of the projection optical system, it is preferable that the following conditional formula (1) be fulfilled:

$$48 < \omega < 60 \quad (1)$$

where $\omega$ represents the maximum angle of view (°).

Conditional formula (1) defines the maximum angle of view of the projection optical system. If the lower limit of conditional formula (1) is transgressed, the projection distance is so long that the rear projection apparatus has an unduly large depth. This makes the projection optical system unsuitable for miniaturization. If the upper limit of conditional formula (1) is transgressed, satisfactory performance cannot be obtained unless either the effective diameter of the front lens unit (GrF) is made larger or the angles of the optical surfaces of the front lens unit (GrF) at their periphery (the angles of tangent lines to each surface at its periphery relative to the normal to the vertex of the surface) are made smaller. Making the effective diameter of the front lens unit (GrF) larger increases the cost of its materials and makes its production difficult. Making the peripheral angles of the optical surfaces of the front lens unit (GrF) smaller results in problems as described earlier. Moreover, these surfaces come to have higher optical powers, and thus become so sensitive to errors as to make the mechanical arrangement and the adjustment procedure difficult. This makes it inevitable to increase the number of lens elements, and thus makes the projection optical system unsuitable for size, weight, and cost reduction.

With respect to the turning aerial interval between the front and rear lens units (GrF and GrR), it is preferable that the following conditional formula (2) be fulfilled:

$$3 < D1/f < 7 \quad (2)$$

where

| | |
|---|---|
| D1 | represents the turning aerial interval (the optical path length, as converted on an air basis, from the most conjugate-reduction-side surface of the front lens unit (GrF) to the most conjugate-enlargement-side surface of the rear lens unit (GrR)); and |
| f | represents the focal length of the entire projection optical system. |

Conditional formula (2) defines the turning aerial length. If the lower limit of conditional formula (2) is transgressed, it is difficult to turn the optical path while keeping the f-number small, and the flexibility of construction is decreased. Moreover, the protrusion of the rear projection apparatus below the screen (SC) is large. If the upper limit of conditional formula (2) is transgressed, the turning aerial length is so long that it is necessary to take the same measures as when the upper limit of conditional formula (1) described earlier is transgressed. This makes the projection optical system unsuitable for size, weight, and cost reduction.

With respect to the positive lens element included in the rear lens unit (GrR) which is made of an anomalous dispersion material, it is preferable that the following conditional formulae (3) and (4) be fulfilled:

$$Vd > 75 \quad (3)$$

$$0.52 < (Ng-Nf)/(Nf-Nc) < 0.56 \quad (4)$$

where

| | |
|---|---|
| Vd | represents the Abbe number (vd) of the anomalous dispersion material; |
| Ng | represents the refractive index of the anomalous dispersion material for the g-line; |
| Nf | represents the refractive index of the anomalous dispersion material for the f-line; and |
| Nc | represents the refractive index of the anomalous dispersion material for the c-line. |

Conditional formulae (3) and (4) define the conditions relating to the anomalous dispersion material. Consider a glass map with (Ng-Nf)/(Nf-Nc) taken along the vertical axis and Vd taken along the horizontal axis. In this glass map, there exist no glass materials that fall outside the triangular region demarcated by the lower limit of conditional formula (3) and the upper and lower limits of conditional formula (4) and that have a very high Vd (for example, 90 or higher). On the other hand, glass materials that fall outside the triangular region and that have a not very high Vd are unsatisfactory in their effect of correcting the secondary spectrum, and thus are not satisfactorily effective in reducing the number of lens elements. Thus, materials that do not fulfill conditional formulae (3) and (4) are not suitable in a projection optical system composed of a small number of lens elements.

With respect to the lens elements included in the front and rear lens units (GrF and GrR) which have aspherical surfaces, it is preferable that the following conditional formula (5) be fulfilled:

$$-0.5 < -ffa/fra < 0.5 \quad (5)$$

where

| | |
|---|---|
| ffa | represents the focal length of the lens element having the aspherical surface included in the front lens unit (GrF); and |
| fra | represents the focal length of the lens element having the aspherical surface included in the rear lens unit (GrR). |

Conditional formula (5) defines the relationship between the focal length of the lens element having the aspherical surface included in the front lens unit (GrF) and that of the lens element having the aspherical surface included in the rear lens unit (GrR) as considered suitable to alleviate defocusing resulting from variations in temperature. In general, composite aspherical-surface lens elements composed of a glass lens element and a thin hardening material (for example, ultraviolet-curing or thermosetting resin) are less prone to variations in temperature properties than plastic lens elements. However, such composite aspherical-surface lens elements are unsuitable for a projection optical system for one or more of the following reasons: a projection optical system for a projector requires considerably large lens diameters; the aspherical shapes used in it deviate greatly from spherical shapes; and such lens elements are expensive to manufacture.

For these reasons, aspherical-surface lens elements molded out of a plastic material are commonly used, whose shapes and refractive indices, however, are very sensitive to variations in temperature. The temperature-related coefficient of linear expansion ($\alpha$) and the temperature-related variation in refractive index ($\Delta n/\Delta T$) of a plastic material are greater, by orders of magnitude, than those of a glass lens element. Moreover, the coefficient of linear expansion ($\alpha$) and the variation in refractive index ($\Delta n/\Delta T$) have opposite signs, and therefore an expansion and a variation in refractive index resulting from a variation in temperature act to deviate the focus in the same direction. In an optical system having a wide angle of view, as in any of the first to seventh embodiments, if the front and rear lens units (GrF and GrR) include plastic lens elements made of an identical material and having an identical focal length, the temperature-related deviation of the focus caused by the plastic lens element included in the rear lens unit (GrR) is about ten times that caused by the plastic lens element included in the front lens unit (GrF). This makes it necessary to limit within a certain range the ratio between the focal lengths of the aspherical-surface lens elements included in the front and rear lens units (GrF and GrR). Conditional formula (5) defines this range. If the range defined by conditional formula (5) is transgressed, variations in temperature cause too great deviations of the focus, and therefore, unless a focusing mechanism interlocked, with a temperature sensor is provided, the projection optical system offers unsatisfactory resolution.

It is further preferable that the following conditional formula (5a); of which the lower limit is raised compared with conditional formula (5), be fulfilled:

$$-0.3 < -ffa/fra < 0.5 \quad (5a)$$

The reason that the lower limit is raised here will be described. For effective correction of distortion, it is preferable that the aspherical-surface lens element included in the front lens unit (GrF) be as close to the conjugate enlargement side as possible, and it is further preferable that it be given a negative optical power. For example, suppose that, when the aspherical-surface lens element included in the front lens unit (GrF) is considered singly, its focus moves in direction +Q as temperature rises. Since the rear lens unit (GrR) has a positive optical power as a whole, when many lens elements of which the coefficient of linear expansion ($\alpha$) and the variation in refractive index ($\Delta n/\Delta T$) have opposite signs are used as glass lens elements other than the aspherical-surface lens elements, even if the error in the focus of the aspherical-surface lens element included in the rear lens unit (GrR) is ignored, it is easier to make those glass lens elements act to shift the focus in direction −Q as temperature rises than in the opposite direction. Thus, it is preferable that conditional formula (5a), of which the lower limit is raised compared with conditional formula (5), be fulfilled.

To make it unnecessary to use many glass lens elements of which the coefficient of linear expansion ($\alpha$) and the variation in refractive index ($\Delta n/\Delta T$) have opposite signs, it is further preferable that the following condition (5b) be fulfilled:

$$-0.1 < -ffa/fra < 0.2 \quad (5b)$$

When an aspherical-surface lens element made of a plastic material is used in the rear lens unit (GrR), the temperature-related error in the focus of that lens element is very large. Therefore, it is preferable that the value calculated by dividing the focal length of the plastic aspherical-surface lens element included in the rear lens unit (GrR) by the focal length of the entire projection optical system fulfill conditional formulae (5c) and (5d) below. Moreover, for the same reason as the lower and upper limits of conditional formula (5) are narrowed as described above, it is preferable that conditional formulae (5e) and (5f) be fulfilled. To permit the aspherical-surface lens element included in the rear lens unit (GrR) to have a long focal length and its aspherical surface to still satisfactorily exert its effect of correcting aberrations, it is preferable that this lens element be a meniscus lens element.

$$fra/f > 4 \quad (5c)$$
$$fra/f < -4 \quad (5d)$$
$$fra/f > 16 \quad (5e)$$
$$fra/f < -8 \quad (5f)$$

It is preferable, as in the sixth and seventh embodiments (FIGS. 10 and 11), that a condenser lens (CL) be disposed between the projection light preparing means (PT) and the light valve (PA). Using a condenser lens (CL) means making the rays passing through the projection light preparing means (PT) less telecentric. In a case where a PBS sheet (PT2) is used as the projection light preparing means (PT), most of the space is not filled by the medium, and therefore it is necessary to secure a longer back focal length than in a case where a PBS prism (PT1), cross dichroic prism (PT3), or the like is used. Even in this case, rays with the same f-number, need to be projected with the same angle of view as otherwise, and therefore it is difficult to maintain the performance of the projection optical system and it is necessary to increase the lens diameters. This makes the projection optical system unsuitable for resolution enhancement and size, weight, and cost reduction. These problems can be overcome by inserting a condenser lens (CL) between the projection light preparing means (PT) and the light valve (PA), though with less telecentricity.

As in any of the first to seventh embodiments, it is preferable that the aspherical surface included in the rear lens unit (GrR) be formed on a lens element other than that disposed at the conjugate-reduction-side end of the rear lens unit (GrR). That is, it is preferable that the aspherical surface be formed on, of the lens elements disposed on the conjugate enlargement side of the projection light preparing means (PT), a lens element other than the most conjugate-reduction-side lens element. This is a condition relating to the position of the aspherical surface in the rear lens unit (GrR). In general, in a projector that projects an enlarged image of an image displayed on a small-size light valve (PA), it is necessary to use an illumination light source and a condenser for condensing the light diverging from it. Here, the relationship between the arc length of the light source, the diameter of the condenser, and the size of the light valve (PA) determines the lower limit of the f-number of the rays emanating from the individual pixels of the light valve (PA). Usually, a particular arc length is involved, and the size of the light valve (PA) is smaller than the condenser for condensing the light from the light source. Thus, to make efficient use of the illumination light, it is essential to use a projection optical system having a small f-number.

On the other hand, reducing the diameter of a projection optical system helps reduce the material and production costs associated with it, and also makes it easy to turn the optical path in the middle of the projection optical system. With consideration given to these facts, the most effective way to realize a projection optical system having a small f-number and a small diameter is to give the lens element of the projection optical system closest to the light valve (PA) a high positive optical power to minimize the diversion of the projection light at its source. However, assigning this role to an aspherical-surface lens element, quite naturally, shortens its focal length, and this is undesirable given the temperature properties of an aspherical-surface lens element described earlier. Thus, the aspherical-surface lens element included in the rear, lens unit (GrR) should not be disposed at its conjugate-reduction-side end.

It is preferable that the first and second lens elements (G1 and G2) be both a meniscus lens element having a negative optical power. This is a condition relating to the shapes of the first and second lens elements (G1 and G2) of the front lens unit (GrF). In a projection optical system of which the first and second lens elements (G1 and G2) have negative optical powers and of which the maximum angle of view (ω) is 48° or larger, to keep the sensitivity to errors low without greatly increasing the number of lens elements, it is important that the total refractive power of the first and second lens elements (G1 and G2) be distributed evenly among their four surfaces so that the rays passing through those lens elements are refracted as gently as possible on each of their surfaces. To achieve this, it is preferable that the first and second lens elements (G1 and G2) be both a meniscus lens element, and it is further preferable that they be meniscus lens elements convex to the conjugate enlargement side.

It is preferable that the lens elements having the aspherical surfaces be made of a plastic material. This is a condition relating to the material of the aspherical-surface lens elements. As described earlier, composite aspherical-surface lens elements composed of a glass lens element and a thin hardening material (for example, ultraviolet-curing resin) are less prone to variations in temperature properties than plastic lens elements, but such composite aspherical-surface lens elements are unsuitable for a projection optical system for one or more of the following reasons: a projection optical system for a projector requires considerably large lens diameters; the aspherical shapes used in it deviate greatly from spherical shapes; and such lens elements are expensive to manufacture. Thus, it is preferable to use aspherical-surface lens elements molded out of a plastic material.

Figure 8:
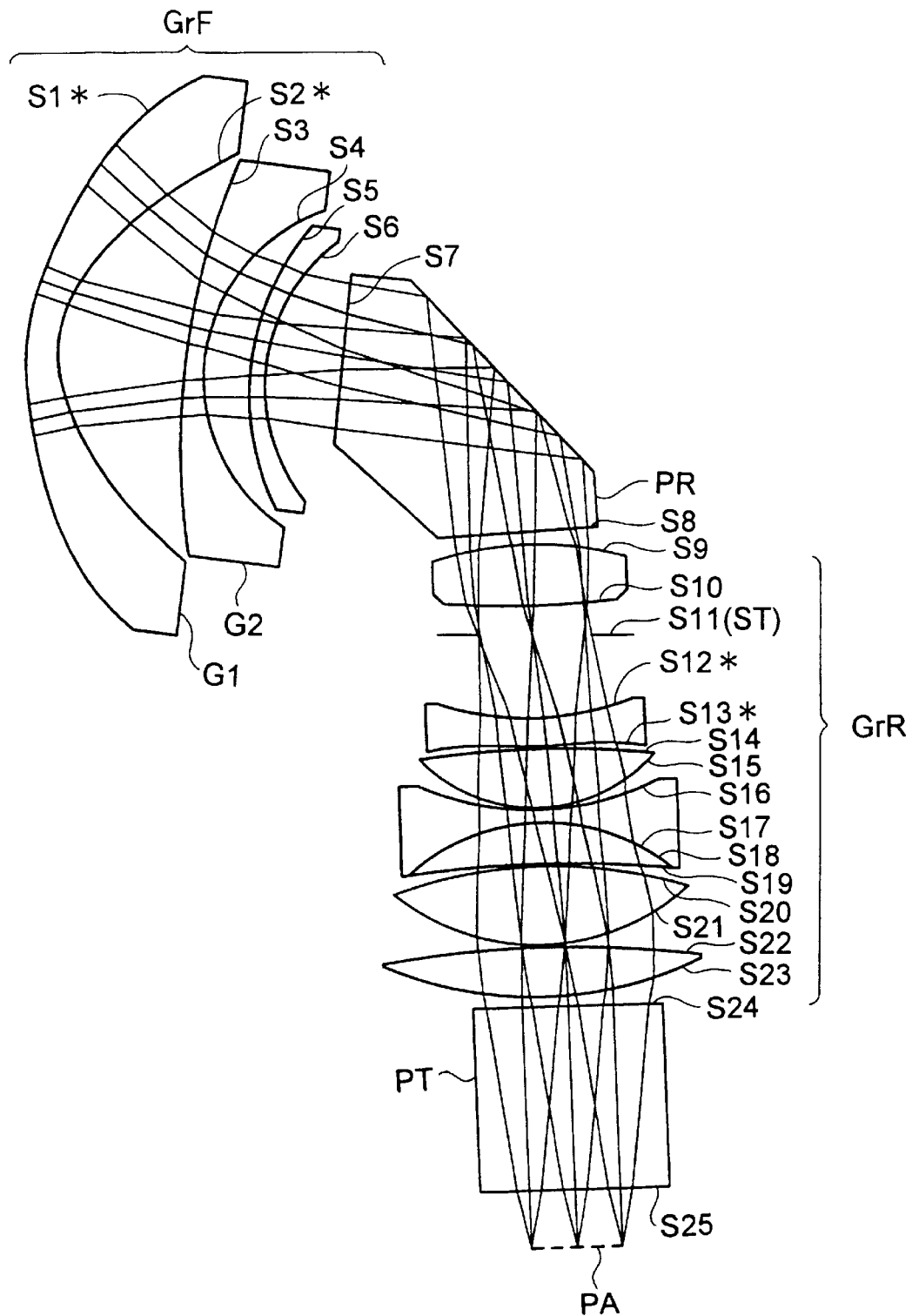
FIG. 8 is a sectional view showing the optical arrangement and the projection optical path of a fifth embodiment (Example 5) of the invention.

It is preferable that, when the entire projection optical system is considered a straight system, the optical axis of the front lens unit (GrF) be optically decentered translationally relative to the optical axis of the rear lens unit (GrR). For example, it is preferable, as in the fifth embodiment shown in FIG. 9, that the optical axis (AXF) of the front lens unit (GrF) be deviated from the optical axis (AXR) of the rear lens unit (GrR), and that this deviation between the optical axes include translational decentering of the front lens unit (GrF) relative to the rear lens unit (GrR). The projection optical system of the fifth embodiment has an optical construction in which the center of the light valve (PA) is located off the optical axis (AXR) of the rear lens unit (GrR) (FIG. 8). This deviation makes it possible to cancel the aberrations caused by the front and rear lens units (GrF and GrR) between themselves. Thus, it is preferable that the optical axes (AXF and AXR) of the front and rear lens units (GrF and GrR) be translationally decentered relative to each other.

Figure 9:
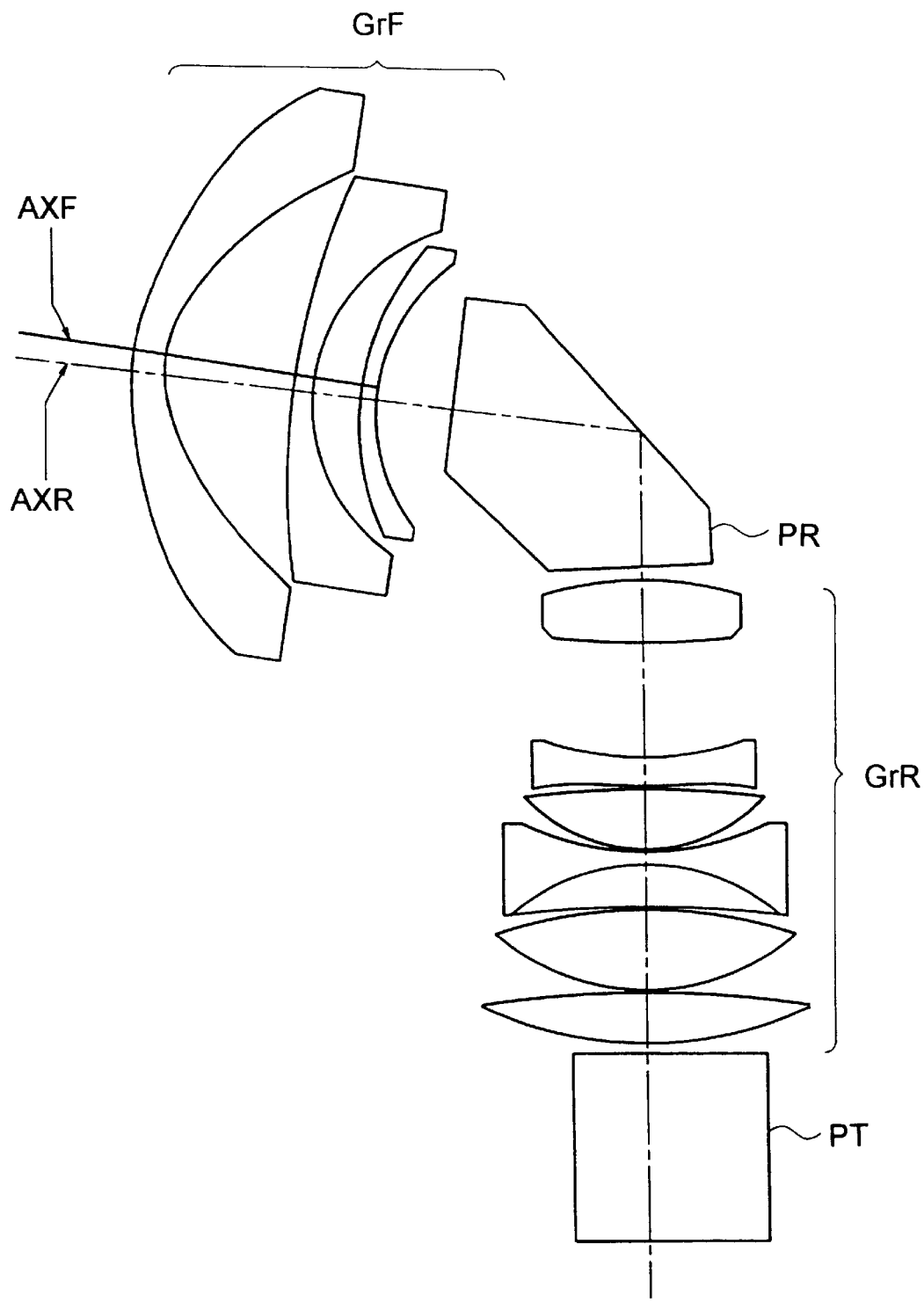
FIG. 9 is a sectional view illustrating how the front and rear lens units are decentered with respect to each other in the fifth embodiment (Example 5)
Figure 10:
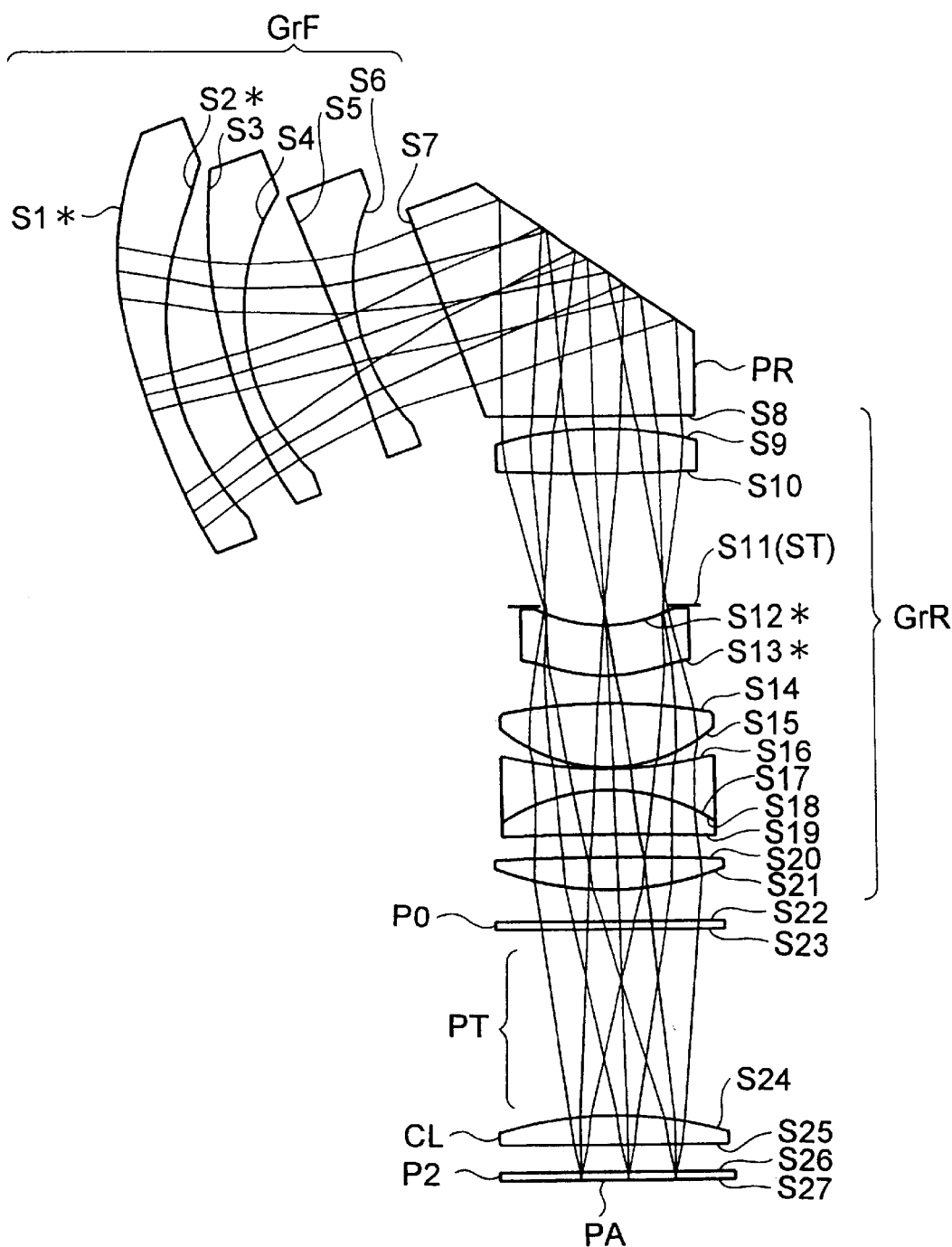
FIG. 10 is a sectional view showing the optical arrangement and the projection optical path of a sixth embodiment (Example 6) of the invention.
Figure 11:
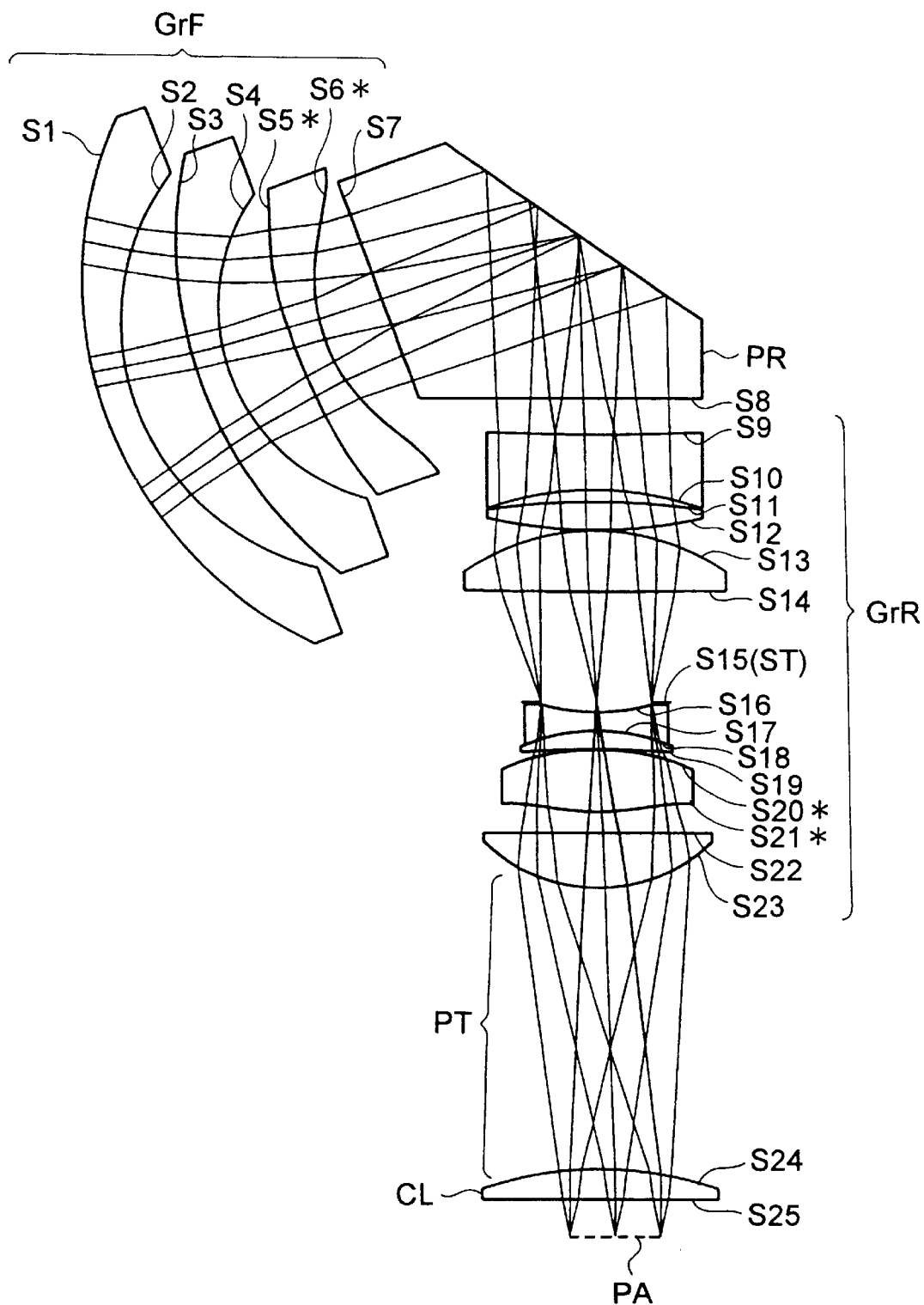
FIG. 11 is a sectional view showing the optical arrangement and the projection optical path of a seventh embodiment (Example 7) of the invention.
Figure 12A:
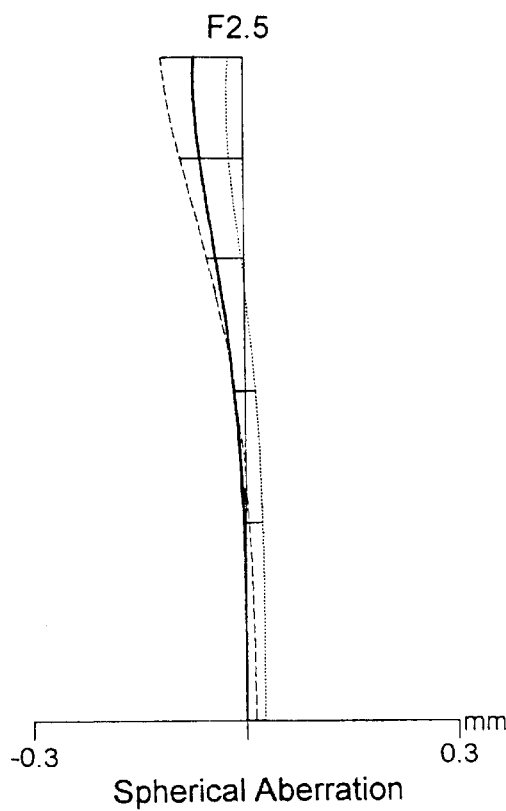
FIGS. 12A to 12D are aberration diagrams of Example 1.
Figure 12B:
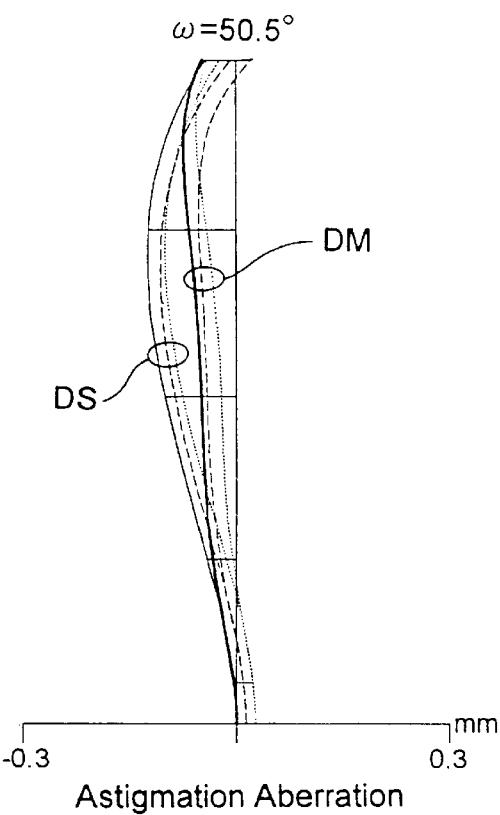
Figure 12C:
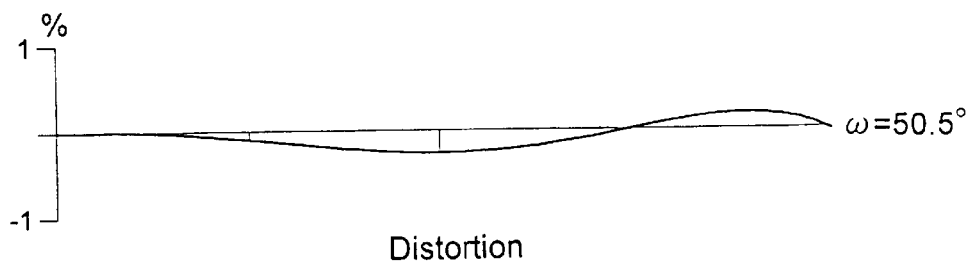
Figure 12D:
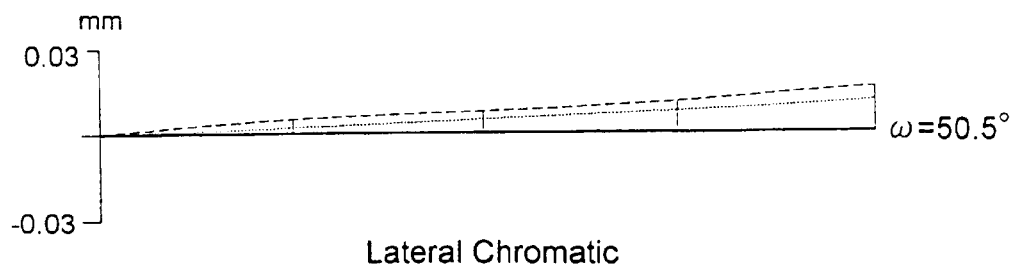
Figure 14A:
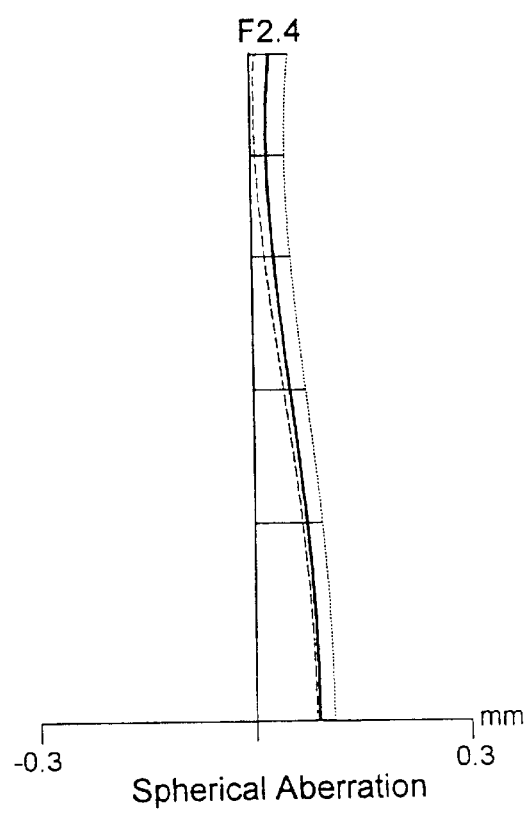
FIGS. 14A to 14D are aberration diagrams of Example 3 (50-inch type)
Figure 14B:
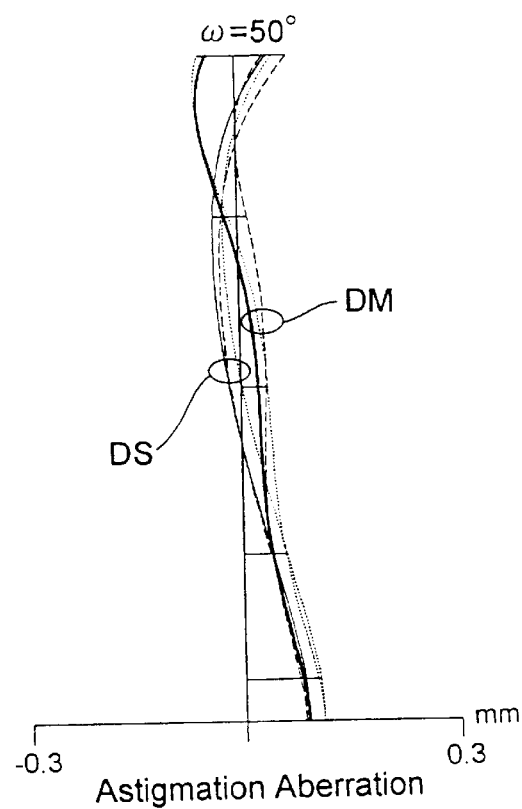
Figure 14C:
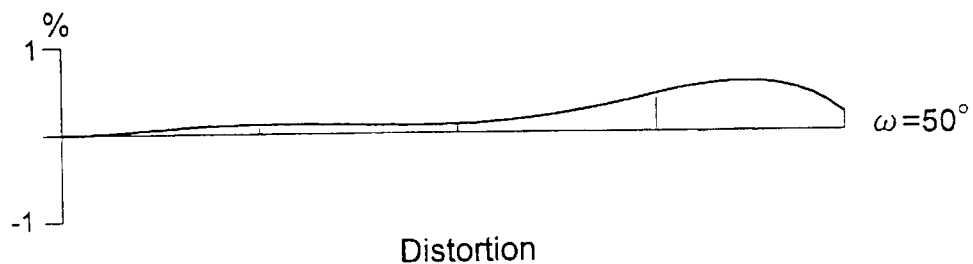
Figure 14D:
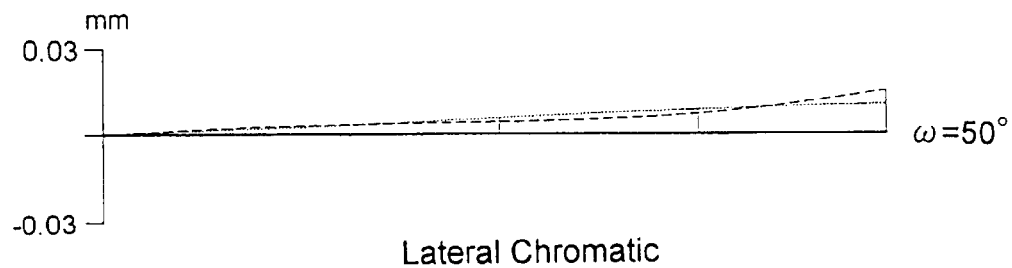
Figure 15A:
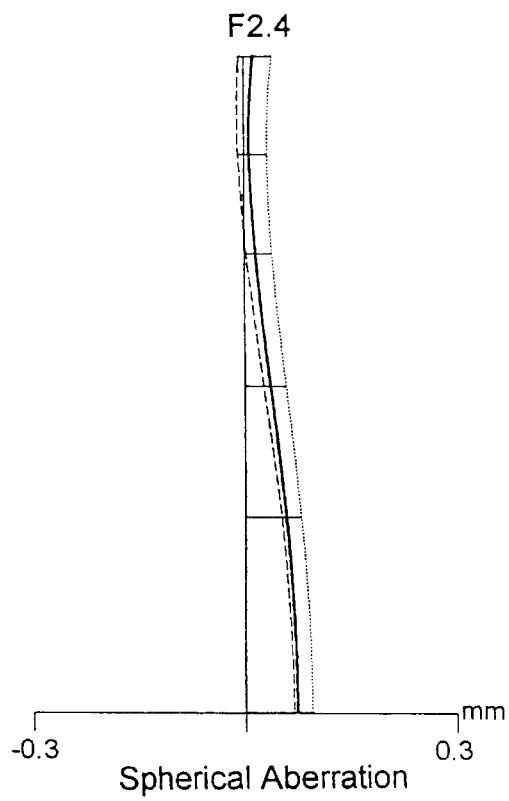
FIGS. 15A to 15D are aberration diagrams of Example 3 (40-inch type)
Figure 15B:
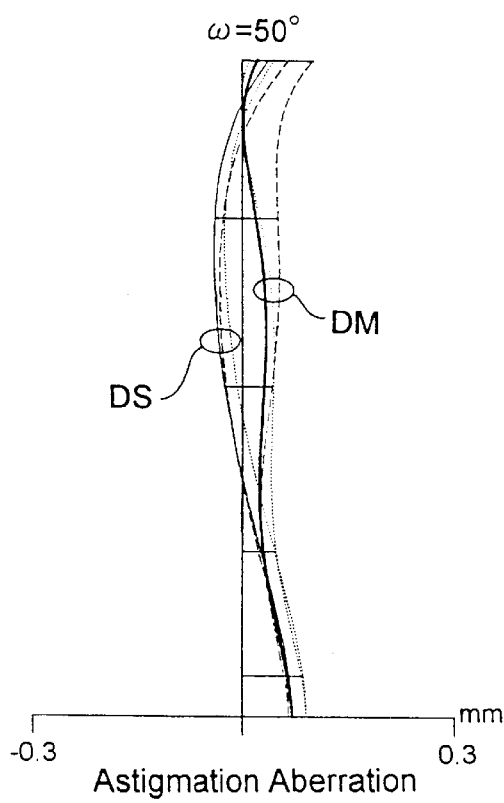
Figure 15C:
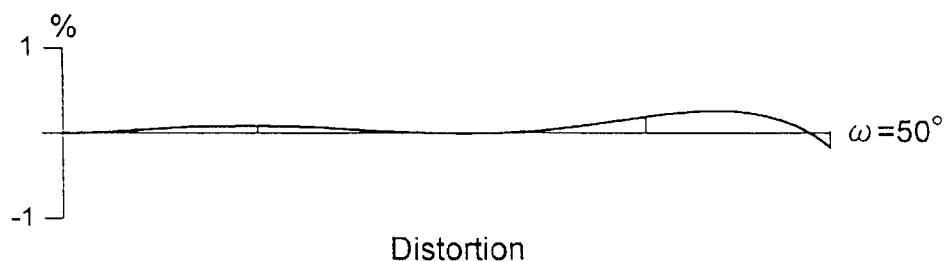
Figure 15D:
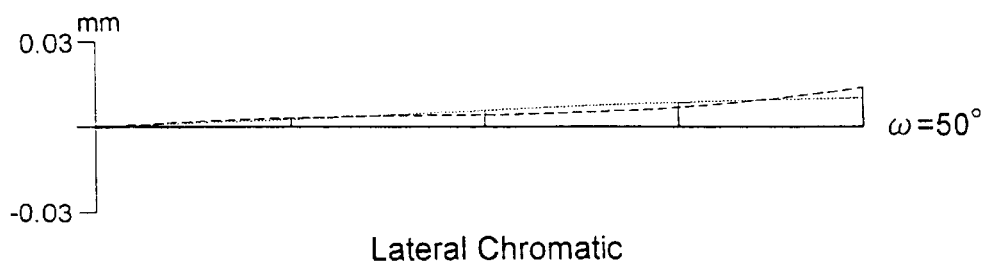
Figure 16A:
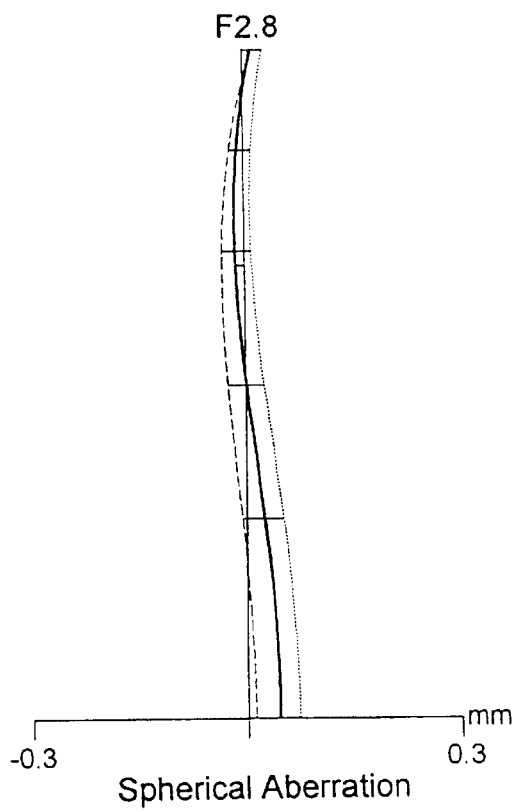
FIGS. 16A to 16D are aberration diagrams of Example 4 (50-inch type)
Figure 16B:
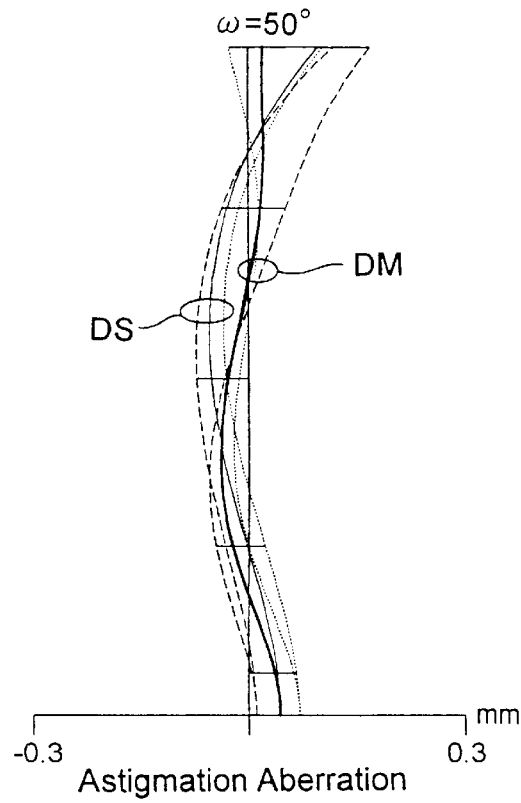
Figure 16C:
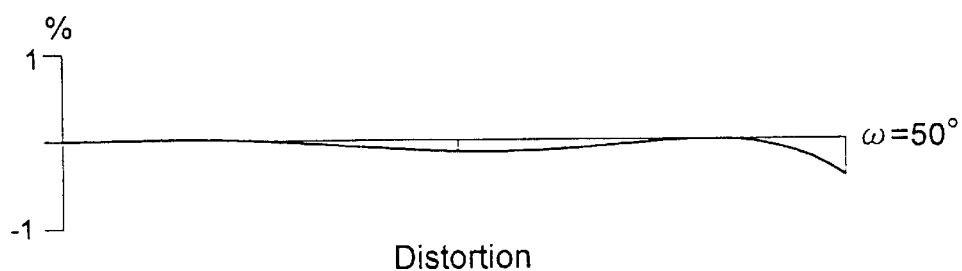
Figure 16D:
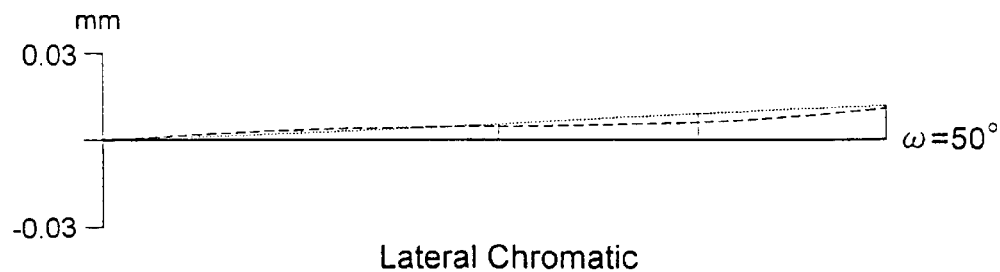
Figure 17A:
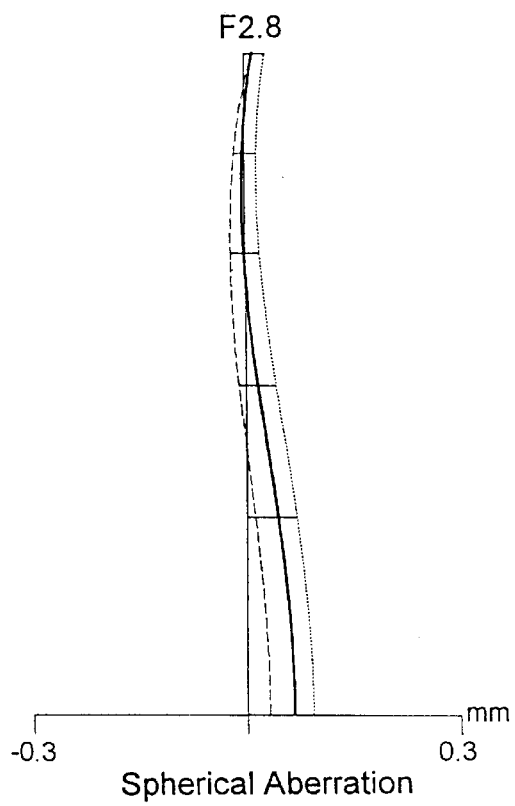
FIGS. 17A to 17D are aberration diagrams of Example 4 (40-inch type)
Figure 17B:
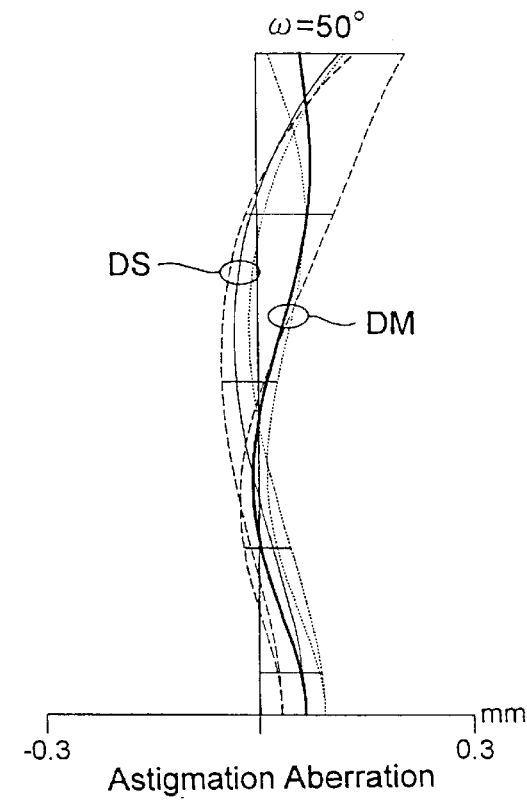
Figure 17C:
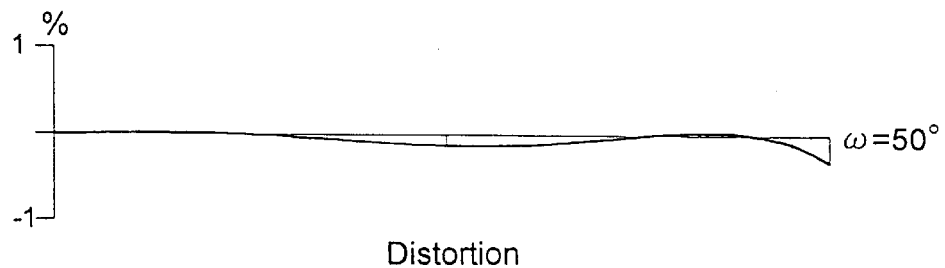
Figure 17D:
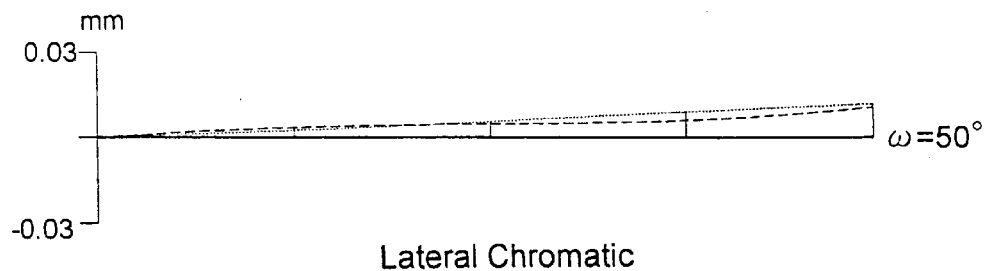
Figure 18A:
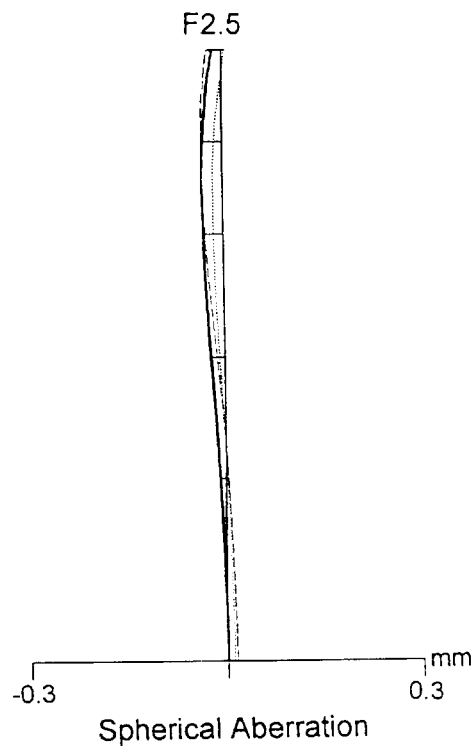
FIGS. 18A to 18D are aberration diagrams of Example 5.
Figure 18B:
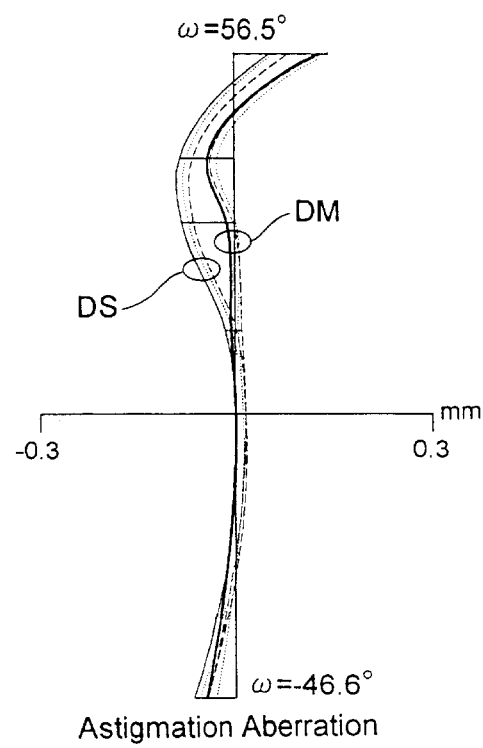
Figure 18C:
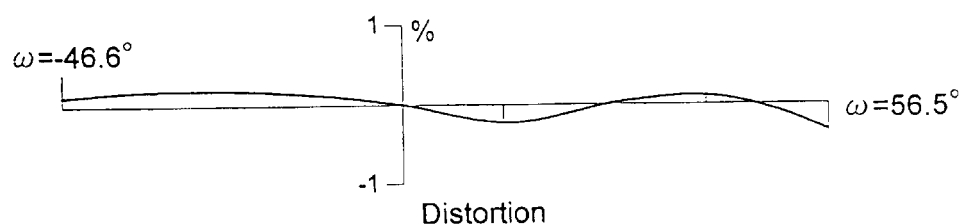
Figure 18D:
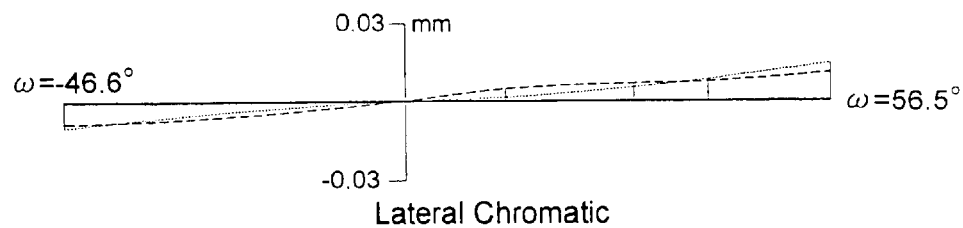
Figure 19A:
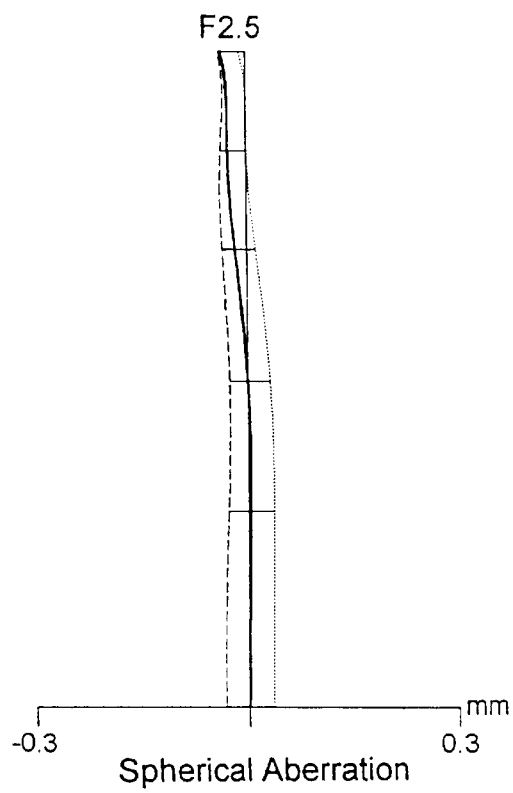
FIGS. 19A to 19D are aberration diagrams of Example 6.
Figure 19B:
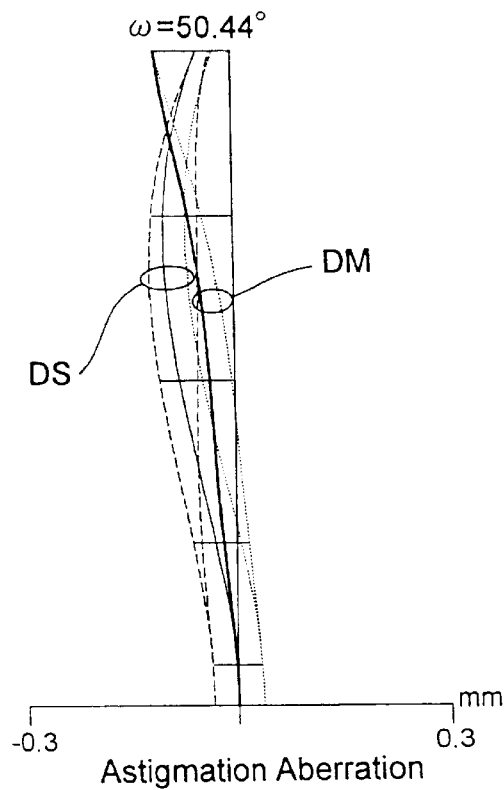
Figure 19C:
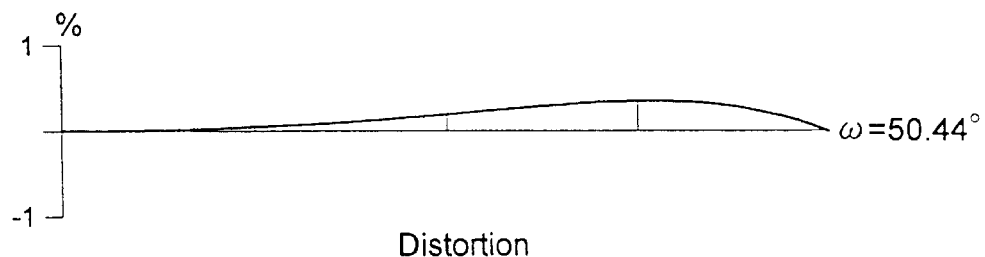
Figure 19D:
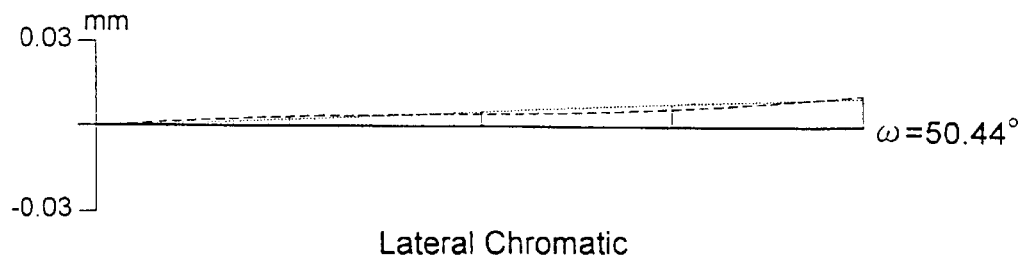
Figure 20A:
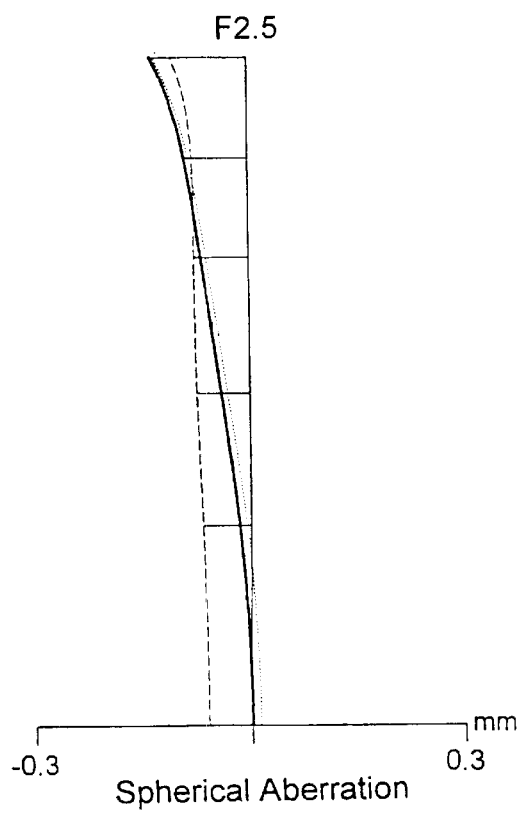
FIGS. 20A to 20D are aberration diagrams of Example 7.
Figure 20B:
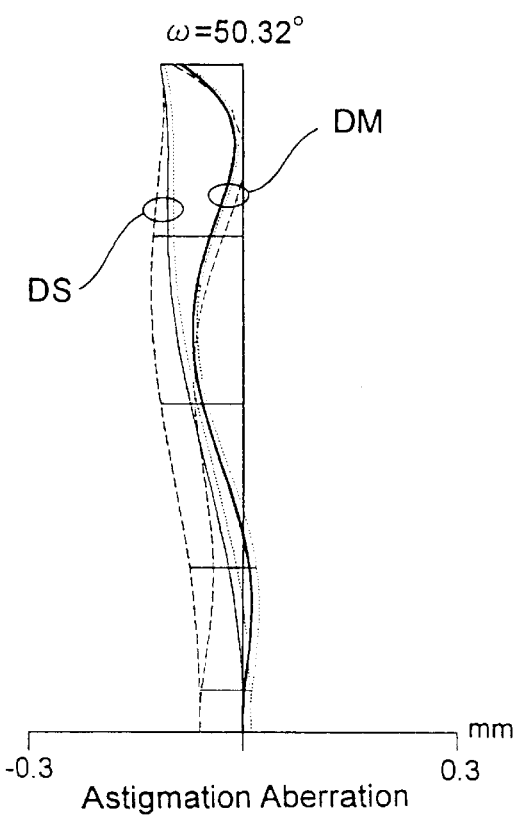
Figure 20C:
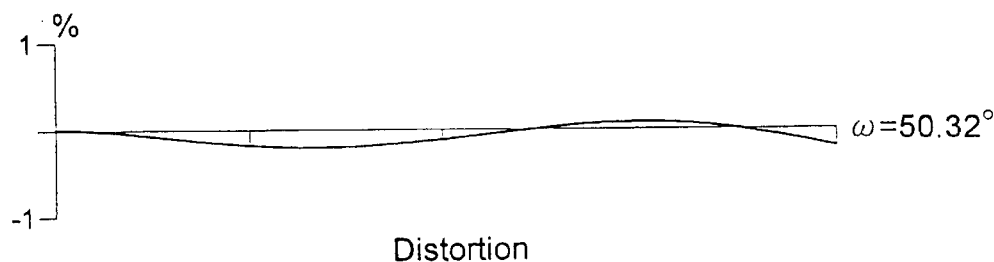
Figure 20D:
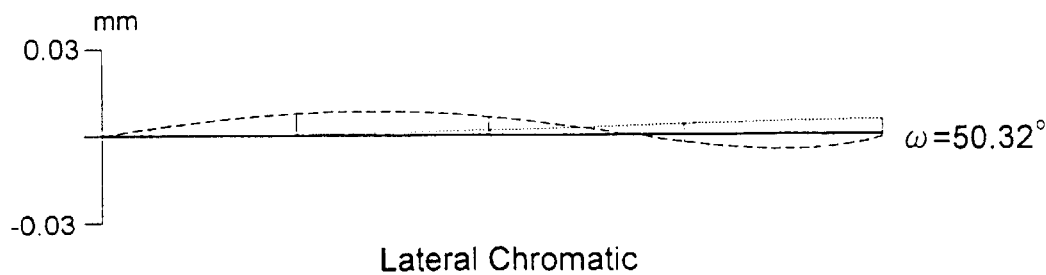

It is preferable that the optical path turning means be realized with a prism (PR), and that at least one of its surfaces be inclined relative to the optical axis (AXR) of the rear lens unit (GrR). This is a condition, applicable in a case where a prism (PR) is used as the optical path turning means, that relates to the inclination of the transmissive surface of the prism, and this condition is fulfilled in the fifth embodiment (FIGS. 8 and 9). The advantages of using a prism (PR) it self are as described earlier, and inclining its refractive surface in addition is effective in correcting astigmatism. In the fifth embodiment, the center of the light valve (PA) is located off the center of the rear lens unit (GrR), and this deviation degrades the quality of the projected image at image heights at which the projected rays strike the screen (SC) at large incident angles, while enhancing the image quality at image heights at which the deviation exerts the opposite effect. Thus, by inclining the prism surface, it is possible to alleviate the unevenness with respect to astigmatism and obtain a better image over the entire screen.

It is preferable that, when the projection optical system is considered a straight system the optical axis (AXR) of the front lens unit (GrF) is optically inclined relative to the optical axis (AXR) of the rear lens unit (GrR). This is a condition relating to the inclination of the optical axes (AXF and AXR) of the front and rear lens units (GrF and GrR) relative to each other, and this condition is fulfilled in the fifth embodiment (FIGS. 8 and 9). In the fifth embodiment, the center of the light valve (PA) is located off the center of the rear lens unit (GrR), and therefore, when the image light at the center of the light valve (PA) offers the best image quality, the entire image plane is inclined in one direction. This inclination can be canceled by inclining the optical axis (AXF) of the front lens unit (GrF) relative to the optical axis (AXR) of the rear lens unit (GrR), and this makes it possible to obtain satisfactory image quality.

In the third and fourth embodiments (FIGS. 3 and 7), the projection optical system is constructed so as to cope with different sizes of the screen (SC) while maintaining the positional relationship between the light valve (PA) and the screen (SC) in the direction of a normal to the screen (SC) (with respect to the center of the screen). Moreover, the projection optical system is built as a unit so that it can be incorporated in rear projection television sets having different screen sizes. For example, in the third embodiment, it is possible to switch between a 40-inch screen (SC) (FIG. 5) and a 50-inch screen (FIG. 6). In a case where switching between a plurality of screen (SC) sizes is permitted, it is preferable that the rear lens unit (GrR) include a first focusing unit that has a positive optical power and that is moved along the optical axis near the aperture stop (ST) inside the rear lens unit (GrR) to achieve focusing and a second focusing unit that has a positive optical power and that is moved along the optical axis to correct slight focusing errors. In the third and fourth embodiments, the first focusing unit is composed of a fourth lens element (G4) and an aperture stop (ST), and the second focusing unit is composed of a ninth lens element (G9). The second focusing unit serves as a focus fine-adjusting means for correcting slight focusing errors arising from errors inevitable with practical mechanical and assembly accuracy and other factors.

By using for focusing, as the first focusing unit, a positively powered lens unit located near the aperture stop (ST), where curvature of field can be corrected, it is possible to achieve focusing while simultaneously correcting the curvature of field that accompanies the focusing. In the rear lens unit (GrR) of an optical system composed of a small number of lens elements, a negatively powered lens unit is too sensitive to chromatic aberration to be suitably used as a focusing unit. For the same reason, the second focusing unit for fine focusing needs to be a unit.having a positive optical power. On the other hand, the front lens unit (GrF) is highly sensitive to the shifting of the projection position and the inclination of the image plane resulting from the inclination of the optical axis, and a single lens element in the front lens unit (GrF), in addition, adversely affects distortion, and is thus unsuitable as a focusing unit. Moreover, it is essential that the second focusing unit cause as little variation in curvature of field as possible as it is moved, and therefore it is preferable that the second focusing unit be located away from the aperture stop (ST).

Furthermore, in an optical system as described above, the space between the aperture stop (ST) and the projection light preparing means (PT) is longer than the interval between the optical path turning means and the aperture stop (ST), and therefore it is preferable that the second focusing unit be located on the conjugate reduction side of the aperture stop (ST). It is preferable that the most conjugate-reduction-side lens element of the projection optical system be a single lens element (i.e., not a cemented lens element or the like) having a positive optical power, and that this lens element alone be used as the second focusing unit, because this minimizes the variation in curvature of field accompanying focusing. Moreover, composing the second focusing unit of a single lens element helps simplify the mechanical design for focusing.

In a case where switching between a plurality of screen (SC) sizes is permitted, it is preferable that at least one lens element included in the first focusing unit be interchangeable with another lens element having at least one surface having a different curvature from that lens element. In the fourth embodiment (FIG. 7), the fourth lens element (G4) is interchangeable to cope with switching between different screen (SC) sizes. Where switching between a plurality of screen (SC) sizes is permitted, diversifying the focusing unit in this way has the following advantage. To say that a particular lens unit is effective in correcting curvature of field is to say that the lens unit causes great variation in curvature of field as it is moved. Therefore, when the amount of focusing achieved as that lens unit is moved is unbalanced with the amount of curvature of field corrected, it is possible, by varying the curvature of at least one surface included in the lens unit, to strike a proper balance between the amount of focusing achieved and the amount of curvature of field corrected. As a further step, by achieving focusing with a single lens element, and diversifying this lens element, i.e. using separate single lens elements for different screen sizes, it is possible to simplify the mechanical design and simultaneously achieve a better balance between the amount of focusing achieved and the amount of curvature of field corrected.

In a case where switching between a plurality of screen (SC) sizes is permitted, it is preferable that at least one lens element included in the front lens unit (GrF) be interchangeable with another lens element having at least one surface having a different curvature from that lens element. In the fourth embodiment (FIG. 7), the third lens element (G3) is interchangeable to cope with switching between different screen (SC) sizes. Where switching between a plurality of screen (SC) sizes is permitted, diversifying the front lens unit (GrF) in its surface arrangement in this way has the following advantage. A refractive surface included in the front lens unit (GrF) is far away from the aperture stop (ST), and therefore the rays passing through it at different image heights are comparatively apart from each other. Thus, such a surface is highly effective in correcting distortion relative to its sensitivity to focusing errors. This makes it possible to achieve correction of distortion that would not be achieved by moving the first focusing unit or interchanging lens elements. Thus, by combining the correction of distortion achieved in this way with the focusing achieved by moving the first focusing unit and interchanging lens elements, it is possible to obtain still better optical performance.

Figure 1:
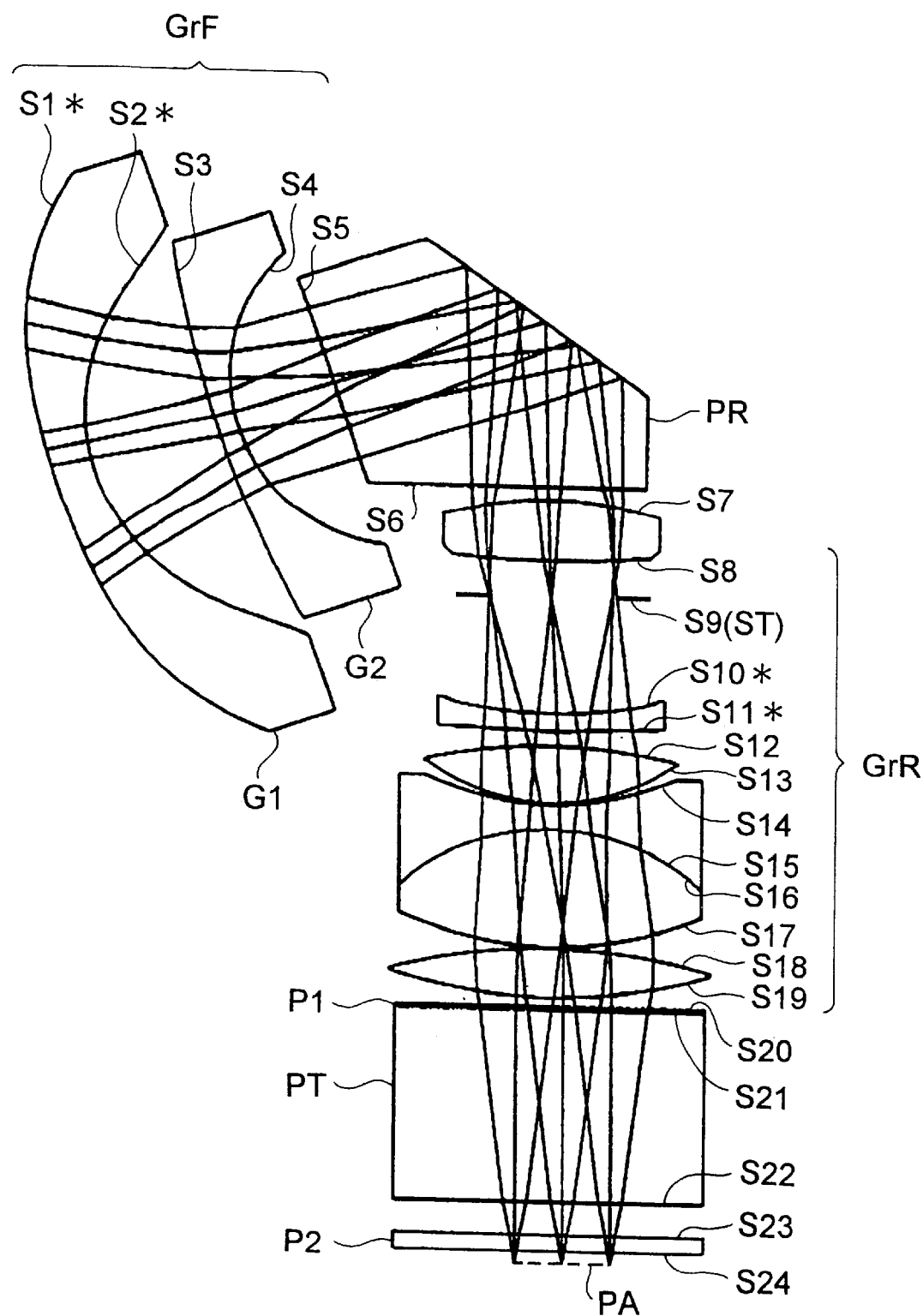
FIG. 1 is a sectional view showing the optical arrangement and the projection optical path of a first embodiment (Example 1) of the invention.
Figure 2:
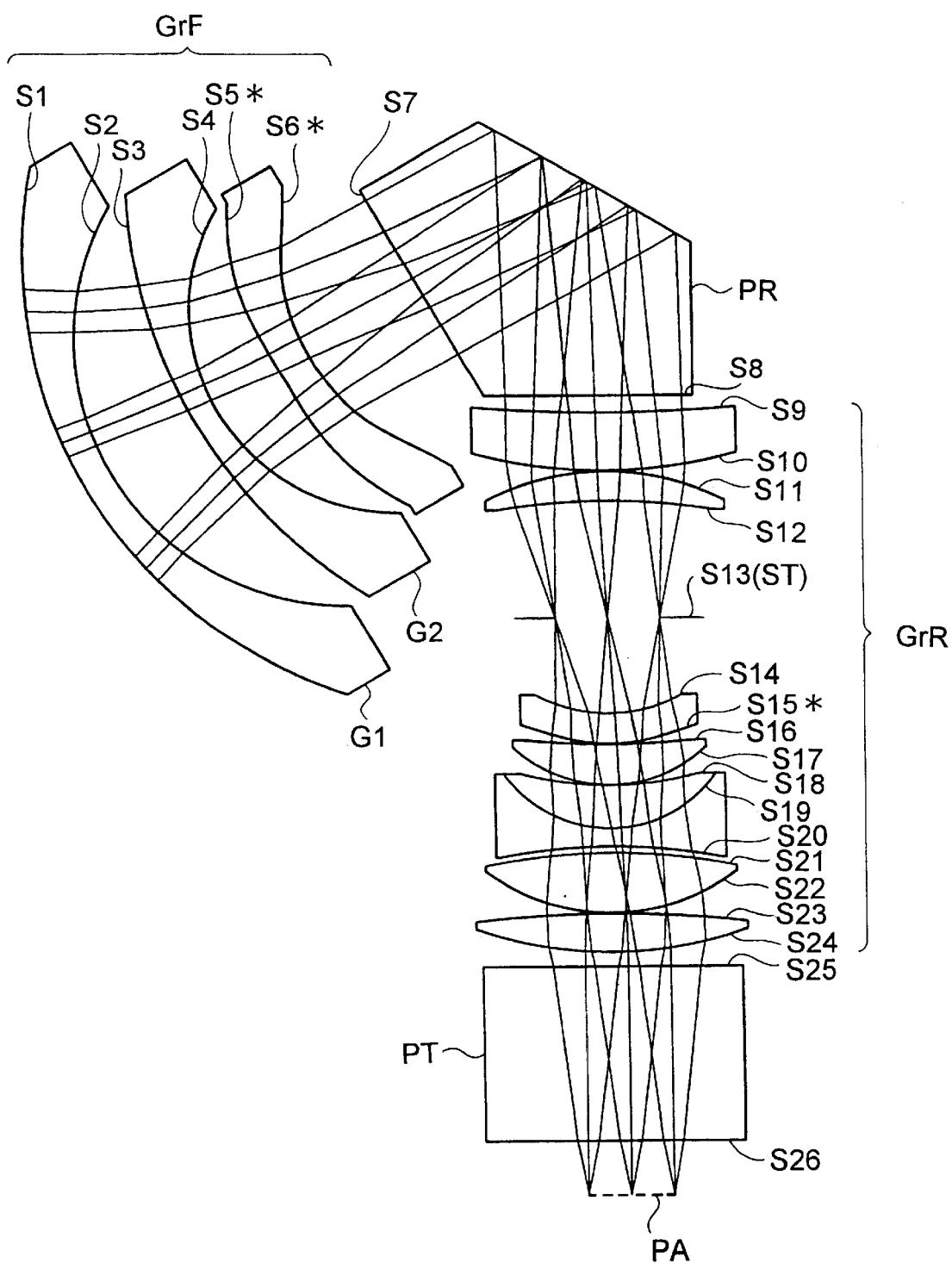
FIG. 2 is a sectional view showing the optical arrangement and the projection optical path of a second embodiment (Example 2) of the invention.
Figure 3:
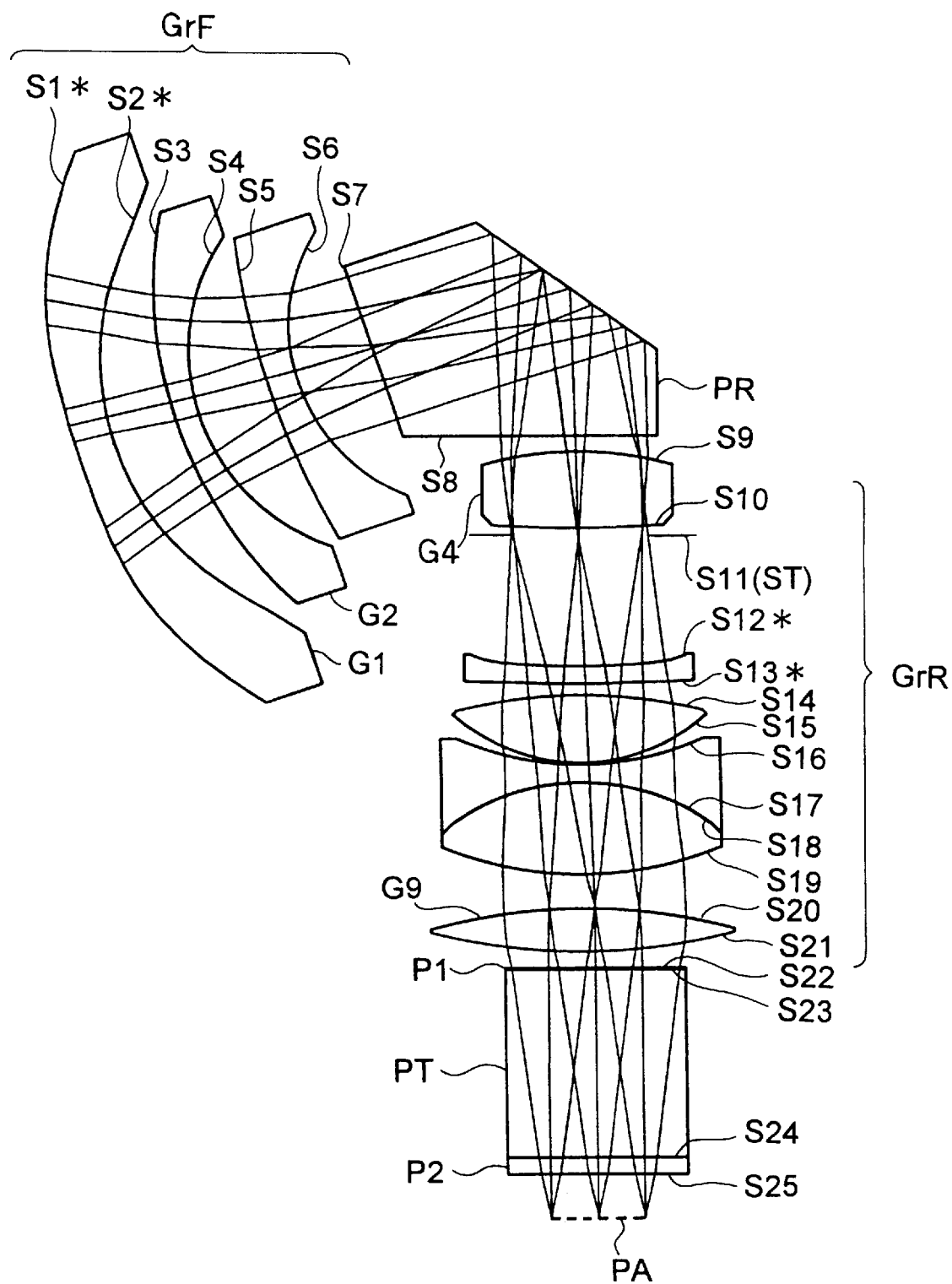
FIG. 3 is a sectional view showing the optical arrangement (40-inch type) and the projection optical path of-a third embodiment (Example 3) of the invention
Figure 4:
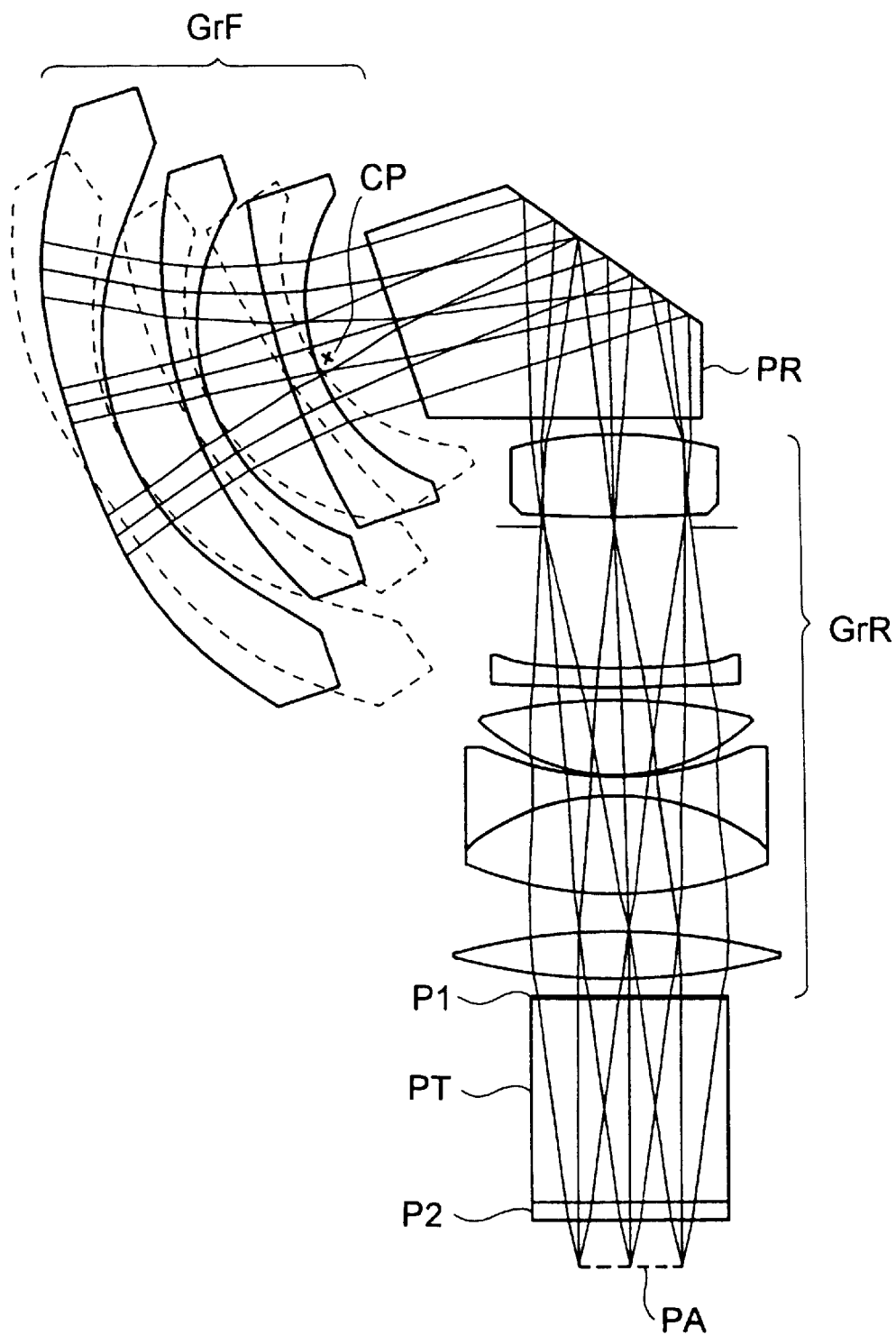
FIG. 4 is a sectional view showing the optical arrangement (40-inch type) and the projection optical path of the third embodiment (Example 3), in a case where the inclination of the image plane is corrected.

It is preferable that the front lens unit (GrF) be designed to be rotatable along a sphere having its center on, the optical axis of the front lens unit (GrF). For example, as in the third embodiment shown in FIG. 4, designing the front lens unit (GrF) to be rotatable along a sphere having its center (CP) on the optical axis of the front lens unit (GrF) makes it possible to correct the inclination of the image plane. The provision of the optical path turning means, such as the prism (PR), makes it difficult to simultaneously form the lens barrels of the front and rear lens units (GrF and GrR). In particular, it is difficult to attain mechanical accuracy so high as to absorb the inclination of the optical axes of the front and rear lens units (GrF and GrR) relative to each other. This inclination causes the image plane to incline, and therefore, to correct the inclination of the image plane while minimizing other aberrations, it is best to rotate the entire front lens unit (GrF) along a sphere having its center (CP) on the optical axis of the front lens unit (GrF).

It is preferable that the rotation center (CP) of the front lens unit (GrF) be located near its rear-side principal point. This makes it possible to correct the inclination of the image plane without moving the projection position. For the same reasons as described above, it is also difficult to attain satisfactory accuracy in terms of the inclination and deviation of the optical path turning means relative to the rear lens unit (GrR). The errors here cause the deviation of the projection position, but, by intentionally locating the rotation center (CP) of the front lens unit (GrF) on the optical axis of the front lens unit (GrF) deviated from its rear-side principal point, it is possible to correct also the deviation of the projection position. Therefore, in a case where the position of the optical path turning means relative to the rear lens unit (GrR) is not accurate enough, it is preferable that the rotation center (CP) of the front lens unit (GrF) be located in a position as described above.

EXAMPLES

Hereinafter, examples of projection optical systems for rear projection according to the present invention will be presented with reference to their construction data and other data. Examples 1 to 7 described below correspond respectively to the first to seventh embodiments described above, and thus FIGS. 1, 2, 3, 7, 8, 10, and 11, which show the first to seventh embodiments, also show the construction and the optical path of the corresponding examples, respectively.

Tables 1, 3, 5, 7, 9, 12, and 14 show the construction data of Examples 1 to 7, respectively. It is to be noted that, since Examples 3 and 4 (Tables 5 and 7) are so constructed as to cope with the switching of the screen (SC) size, their construction data includes two sets of data, one for each of the positions for 50-inch and 40-inch screens. In the construction data of each example, Si (i=1, 2, 3, . . .) represents the i-th surface as counted from the conjugate enlargement side, under the heading "CR" are listed the radii of curvature (mm) of the surfaces Si, under the heading "T" are listed axial distances (mm), and under the headings Nd and vd are respectively listed the refractive indices for the d-line and the Abbe numbers of the individual optical elements. A surface Si marked with an asterisk (*) is an aspherical surface, of which the surface shape is defined by formula (AS) below. Tables 2, 4, 6, 8, 11, 13, and 15 show the data of the aspherical surfaces (where E-n represents $\times 10^{-n}$) in Examples 1 to 7, respectively $$X(H) = (C0 \cdot H^2)/(1+\sqrt{1-\epsilon \cdot C0^2 \cdot H^2}) + (A4 \cdot H^4 + A6 \cdot H^6 + A8 \cdot H^8 + A10 \cdot H^{10} + A12 \cdot H^{12}) \quad (AS)$$

where $X(H)$ represents the displacement along the optical axis at the height H (relative to the vertex);

-continued

| | |
|---|---|
| H | represents the height in a direction perpendicular to the optical axis; |
| CO | represents the paraxial curvature (=1/CR); |
| ε | represents the quadric surface parameter; and |
| Ai | represents the aspherical surface coefficient of i-th order (i = 4, 6, 8, 10, and 12). |

Table 10 show s the coordinate data of Example 5. In the construction data of Example 5, the arrangement of the surfaces within a centered system is identified by axial distances (T) from the surface located immediately on its conjugate enlargement side, and the most conjugate-enlargement-side surfaces (S1, S7, S8, and S9) of centered systems that are decentered with respect to each other are identified by their coordinates. The arrangement of the surfaces (S1, S7, S8, and S9) that are identified by their coordinates is identified, more specifically, by their position and inclination. The position of each of the surfaces (S1, S7, S8, and S9) is represented by the coordinates of its vertex in a global Cartesian coordinate system (x, y, z) having its origin (0, 0, 0) at the vertex of the first surface (S1) and its x-axis along the normal to the first surface (S1) at its vertex (positive on the conjugate reduction side). In the first surface (S1), the tangent plane at its vertex coincides with the y-z plane (with the z-axis perpendicular to the plane of each optical sectional view), and the optical axis (AXF, FIG. 9) of the front lens unit (GrF) passing through the vertex coincides with the x-axis. However, since the optical path is turned by the prism (PR), the optical axis (AXF) passing through each surface does not coincide with the x-axis. Thus, the inclination of each of the surfaces (S1, S7, S8, and S9) is represented by the rotation angle, as measured about the z-axis (positive in the clockwise direction), formed between the normal to it at its vertex and the optical axis (AXF).

Tables 16 and 17 show the data corresponding to the conditional formulae, related data (FNO, i.e., f-numbers), and angle data (°) of each embodiment. It is to be noted that, in Examples 6 and 7, the focal length (f) of the entire system includes the condenser lens (CL) located near the light valve (PA). It is also to be noted that, in conditional formula (4), the value of (Ng−Nf)/(Nf−Nc) is the value calculated for an anomalous dispersion material whose Abbe number (vd) is 75 or higher.

FIGS. 12A to 12D are aberration diagrams of Example 1; FIGS. 13A to 13D are aberration diagrams of Example 2; FIGS. 14A to 14D are aberration diagrams of Example 3, as obtained in the optical arrangement for a 50-inch screen; FIGS. 15A to 15D are aberration diagrams of Example 3, as obtained in the optical arrangement for a 40-inch screen; FIGS. 16A to 16D are aberration diagrams of Example 4, as obtained in the optical arrangement for a 50-inch screen; FIGS. 17A to 17D are aberration diagrams of Example 4, as obtained in the optical arrangement for a 40-inch screen; FIGS. 18A to 18D are aberration diagrams of Example 5; FIGS. 19A to 19D are aberration diagrams of Example 6; and FIGS. 20A to 20D are aberration diagrams of Example 7. Of these aberration diagrams, FIGS. 12A, 13A, 14A, 15A, 16A, 17A, 18A, 19A, and 20A show spherical aberration (mm, with FNO taken along the vertical axis), FIGS. 12B, 13B, 14B, 15B, 16B, 17B, 18B, 19B, and 20B show astigmatism (mm, with ω° taken along the vertical axis), FIGS. 12C, 13C, 14C, 15C, 16C, 17C, 18C, 19C, and 20C show distortion (%, with ω° taken along the horizontal axis), and FIGS. 12D, 13D, 14D, 15D, 16D, 17D, 18D, 19D, and 20D show lateral chromatic aberration (mm, with ω° taken along the horizontal axis). In these aberration diagrams, thick and fine solid lines represent aberrations for light having a wavelength of 546 nm, broken lines with longer strokes represent aberrations for light having a wavelength of 450 nm, and broken lines with shorter strokes represent aberrations for light having a wavelength of 605 nm. In the astigmatism diagrams, DM indicates the astigmatism as observed on the meridional plane, and DS indicates the astigmatism as observed on the sagittal plane.

As described above, according to the present invention, it is possible to realize a light-weight, compact projection optical system that offers a wide angle of view and high performance. By the use of a projection optical system according to the invention, it is possible to obtain high-resolution projected images, and to enhance image quality and simultaneously achieve weight and thickness reduction in a rear projection apparatus.

TABLE 1

Construction Data of Example 1

| Surface | CR | T | Nd | vd | Optical Element |
|---|---|---|---|---|---|
| S1* | 141.48834 | | | | |
| | | 6.0006 | 1.49140 | 57.82 | G1 |
| S2* | 29.96838 | | | | |
| | | 19.7061 | | | Front Lens Unit(GrF) |
| S3 | 161.19465 | | | | |
| | | 3.0000 | 1.74250 | 52.47 | G2 |
| S4 | 25.98577 | | | | |
| | | 15.9615 | | | |
| S5 | ∞ | | | | |
| | | 58.3635 | 1.51680 | 64.20 | Prism(PR) |
| S6 | ∞ | | | | |
| | | 1.9959 | | | |
| S7 | 52.71648 | | | | |
| | | 9.5940 | 1.51680 | 64.20 | |
| S8 | −154.22228 | | | | |
| | | 5.2871 | | | Aperture Stop(ST) |
| S9 | ∞ | | | | |
| | | 18.0934 | | | |
| S10* | −73.61986 | | | | |
| | | 2.7387 | 1.49140 | 57.82 | Rear Lens Unit(GrR) |
| S11* | −99.55909 | | | | |
| | | 2.3085 | | | |
| S12 | 77.27975 | | | | |
| | | 9.2530 | 1.49310 | 83.58 | Vd |
| S13 | −30.57623 | | | | |
| | | 0.2000 | | | |
| S14 | −43.15452 | | | | |
| | | 3.8736 | 1.75000 | 25.14 | |
| S15 | 33.96243 | | | | |
| | | 0.0301 | 1.51400 | 42.83 | |
| S16 | 33.96243 | | | | |
| | | 18.3623 | 1.51680 | 64.20 | |
| S17 | −54.57192 | | | | |
| | | 0.2000 | | | |
| S18 | 84.69408 | | | | |
| | | 7.4923 | 1.66998 | 39.23 | |
| S19 | −84.70589 | | | | |
| | | 1.6000 | | | |
| S20 | ∞ | | | | |
| | | 0.3000 | 1.51680 | 64.20 | λ/4 Plate(P1) |
| S21 | ∞ | | | | |
| | | 29.3300 | 1.66998 | 63.18 | Prism(PT) |
| S22 | ∞ | | | | |
| | | 5.0000 | | | |
| S23 | ∞ | | | | |
| | | 2.6000 | 1.51680 | 64.20 | λ/2 Plate(P2) |
| S24 | ∞ | | | | |

TABLE 2

| Surface | Aspherical Surface Data of Example 1 | | | |
|---|---|---|---|---|
| S1 | $\epsilon$ | −8.76522 | A8 | 6.63642E-14 |
| | A4 | 3.86082E-06 | A10 | 9.63688E-17 |
| | A6 | −9.35113E-10 | A12 | −1.62059E-20 |
| S2 | $\epsilon$ | −1.03211 | A8 | −3.42268E-12 |
| | A4 | 8.11718E-06 | A10 | 1.90515E-13 |
| | A6 | 3.02295E-09 | A12 | −7.92054E-17 |
| S10 | $\epsilon$ | 6.48721 | A8 | −1.90724E-10 |
| | A4 | 5.32928E-06 | A10 | 1.90515E-13 |
| | A6 | 4.15957E-09 | A12 | −7.92054E-17 |
| S11 | $\epsilon$ | 5.68815 | A8 | −1.48671E-10 |
| | A4 | 0.000016628 | A10 | 1.30268E-13 |
| | A6 | 8.88780E-09 | A12 | 1.56883E-16 |

TABLE 3

Construction Data of Example 2

| Surface | CR | T | Nd | vd | Optical Element |
|---|---|---|---|---|---|
| S1 | 78.48363 | | | | |
| | | 5.0000 | 1.71300 | 53.93 | G1 |
| S2 | 45.53334 | | | | |
| | | 16.6455 | | | Front Lens Unit(GrF) |
| S3 | 85.56743 | | | | |
| | | 4.2000 | 1.71300 | 53.93 | G2 |
| S4 | 34.62236 | | | | |
| | | 12.4373 | | | |
| S5* | ∞ | | | | |
| | | 5.6000 | 1.49300 | 58.34 | |
| S6* | 43.44115 | | | | |
| | | 21.7816 | | | |
| S7 | ∞ | | | | |
| | | 70.0000 | 1.51680 | 64.20 | Prism(PR) |
| S8 | ∞ | | | | |
| | | 2.8585 | | | |
| S9 | −263.50494 | | | | |
| | | 10.0000 | 1.74400 | 44.93 | |
| S10 | −84.41499 | | | | |
| | | 0.1000 | | | |
| S11 | 43.87893 | | | | |
| | | 4.8899 | 1.74400 | 44.93 | |
| S12 | 106.34112 | | | | |
| | | 20.1236 | | | Aperture Stop(ST) |
| S13 | ∞ | | | | |
| | | 16.3002 | | | |
| S14 | −25.19628 | | | | |
| | | 5.0000 | 1.49300 | 58.34 | Rear Lens Unit(GrR) |
| S15* | −28.55819 | | | | |
| | | 0.1000 | | | |
| S16 | −140.89722 | | | | |
| | | 6.8927 | 1.49310 | 83.58 | Vd |
| S17 | −24.11536 | | | | |
| | | 0.1000 | | | |
| S18 | −56.50237 | | | | |
| | | 7.3511 | 1.48749 | 70.44 | |
| S19 | −21.95444 | | | | |
| | | 3.0000 | 1.80518 | 25.43 | |
| S20 | 96.28707 | | | | |
| | | 1.1447 | | | |
| S21 | 103.83720 | | | | |
| | | 10.0000 | 1.49310 | 83.58 | Vd |
| S22 | −35.97460 | | | | |
| | | 0.1000 | | | |
| S23 | 198.39144 | | | | |
| | | 6.6617 | 1.80518 | 25.43 | |
| S24 | −67.14422 | | | | |
| | | 2.5200 | | | |
| S25 | ∞ | | | | |
| | | 30.0000 | 1.62041 | 60.29 | Prism(PT) |
| S26 | ∞ | | | | |

TABLE 4

| Surface | Aspherical Surface Data of Example 2 | | | |
|---|---|---|---|---|
| S5 | $\epsilon$ | 1.00000 | A8 | 3.33793E-11 |
| | A4 | 2.28136E-05 | A10 | −2.12345E-14 |
| | A6 | −3.29055E-08 | A12 | 6.13134E-18 |
| S6 | $\epsilon$ | 1.00000 | A8 | 1.46371E-11 |
| | A4 | 1.86529E-05 | A10 | −1.47111E-14 |
| | A6 | −3.22858E-08 | A12 | — |
| S15 | $\epsilon$ | 1.00000 | A8 | −4.44824E-12 |
| | A4 | 1.72213E-05 | A10 | −1.47111E-14 |
| | A6 | 1.65336E-08 | A12 | — |

TABLE 5

Construction Data of Example 3

| Surface | CR | T (50-inch) | T (40-inch) | Nd | vd | Optical Element |
|---|---|---|---|---|---|---|
| S1* | 235.02315 | | | | | |
| | | 5.2644 | (see left) | 1.49140 | 57.82 | G1 |
| S2* | 44.22783 | | | | | |
| | | 10.2816 | (see left) | | | Front Lens Unit(GrF) |
| S3 | 56.04690 | | | | | |
| | | 3.0000 | (see left) | 1.71700 | 47.86 | G2 |
| S4 | 32.14804 | | | | | |
| | | 13.0368 | (see left) | | | |
| S5 | 227.07816 | | | | | |
| | | 2.4600 | (see left) | 1.60729 | 59.48 | |
| S6 | 28.47818 | | | | | |
| | | 12.5773 | (see left) | | | |
| S7 | ∞ | | | | | |
| | | 55.0000 | (see left) | 1.51680 | 64.20 | Prism(PR) |
| S8 | ∞ | | | | | |
| | | 2.0000 | 2.2696 | | | |
| S9 | 57.85397 | | | | | |
| | | 12.0000 | (see left) | 1.74000 | 28.26 | G4 |
| S10 | −195.48217 | | | | | |
| | | 2.6193 | (see left) | | | Aperture Stop(ST) |
| S11 | ∞ | | | | | |
| | | 21.2399 | 20.9703 | | | |
| S12* | −90.74771 | | | | | |
| | | 2.5031 | (see left) | 1.49140 | 57.82 | Rear Lens Unit(GrR) |
| S13* | −93.29430 | | | | | |
| | | 1.0300 | (see left) | | | |
| S14 | 72.33849 | | | | | |
| | | 11.2064 | (see left) | 1.49310 | 83.58 | Vd |
| S15 | −28.32637 | | | | | |
| | | 0.2000 | (see left) | | | |
| S16 | −46.04868 | | | | | |
| | | 2.8000 | (see left) | 1.80518 | 25.43 | |
| S17 | 35.04837 | | | | | |
| | | 0.0301 | (see left) | 1.51400 | 42.83 | |
| S18 | 35.04837 | | | | | |
| | | 13.9716 | (see left) | 1.51680 | 64.20 | |
| S19 | −49.49406 | | | | | |
| | | 6.1349 | (see left) | | | |
| S20 | 102.67120 | | | | | |
| | | 5.9907 | (see left) | 1.74000 | 31.72 | G9 |
| S21 | −102.68094 | | | | | |
| | | 3.5000 | (see left) | | | |
| S22 | ∞ | | | | | |
| | | 0.3000 | (see left) | 1.51680 | 64.20 | $\lambda$/4 Plate(P1) |
| S23 | ∞ | | | | | |
| | | 29.5000 | (see left) | 1.67790 | 53.38 | Prism(PT) |
| S24 | ∞ | | | | | |
| | | 2.6000 | (see left) | 1.51680 | 64.20 | $\lambda$/2 Plate(P2) |
| S25 | ∞ | | | | | |

TABLE 6

| Surface | Aspherical Surface Data of Example 3 | | | |
|---|---|---|---|---|
| S1 | $\epsilon$ | 1.46380 | A8 | 2.59057E-13 |
| | A4 | 4.79852E-06 | A10 | 1.03650E-16 |
| | A6 | -1.81462E-09 | A12 | -3.76804E-20 |
| S2 | $\epsilon$ | -4.97137 | A8 | -3.86301E-12 |
| | A4 | 9.50835E-06 | A10 | 2.07344E-15 |
| | A6 | -1.31973E-09 | A12 | -3.77595E-19 |
| S12 | $\epsilon$ | 22.35470 | A8 | -9.65357E-11 |
| | A4 | 4.81036E-06 | A10 | 1.57010E-13 |
| | A6 | -2.79251E-08 | A12 | — |
| S13 | $\epsilon$ | 2.64561 | A8 | -1.05918E-10 |
| | A4 | 1.37014E-05 | A10 | 2.54580E-13 |
| | A6 | -1.54358E-08 | A12 | — |

TABLE 8

| Surface | Aspherical Surface Data of Example 4 | | | |
|---|---|---|---|---|
| S1 | $\epsilon$ | 15.03270 | A8 | 2.72000E-14 |
| | A4 | 0.00000461 | A10 | 1.75000E-16 |
| | A6 | -1.42000E-09 | A12 | -4.90000E-20 |
| S2 | $\epsilon$ | -3.89066 | A8 | -4.29000E-12 |
| | A4 | 0.0000071 | A10 | -1.12000E-13 |
| | A6 | 1.47000E-09 | A12 | — |
| S12 | $\epsilon$ | 4.29686 | A8 | -1.02000E-10 |
| | A4 | 0.00000622 | A10 | -1.12000E-13 |
| | A6 | -2.0200E-08 | A12 | — |
| S13 | $\epsilon$ | 5.05452 | A8 | -1.39000E-10 |
| | A4 | 0.0000182 | A10 | 2.43000E-13 |
| | A6 | 1.19000E-08 | A12 | — |

TABLE 7

Construction Data of Example 4

| Surface | CR (50-inch) | CR (40-inch) | T (50-inch) | T (40-inch) | Nd | vd | Optical Element |
|---|---|---|---|---|---|---|---|
| S1* | 252.90973 | (see left) | | | | | |
| | | | 5.0000 | (see left) | 1.49140 | 57.82 | G1 |
| S2* | 46.74273 | (see left) | | | | | |
| | | | 9.1964 | (see left) | | | Front Lens Unit(GrF) |
| S3 | 67.97958 | (see left) | | | | | |
| | | | 3.0000 | (see left) | 1.71300 | 53.94 | G2 |
| S4 | 34.16187 | (see left) | | | | | |
| | | | 12.2918 | (see left) | | | |
| S5 | 124.40039 | (see left) | | | | | |
| | | | 2.4600 | (see left) | 1.61800 | 63.39 | G3 |
| S6 | 31.48367 | 31.94194 | | | | | |
| | | | 13.3662 | (see left) | | | |
| S7 | ∞ | (see left) | | | | | |
| | | | 55.0000 | (see left) | 1.51680 | 64.20 | Prism(PR) |
| S8 | ∞ | (see left) | | | | | |
| | | | 2.0000 | 2.3771 | | | |
| S9 | 85.90401 | 82.91530 | | | | | |
| | | | 11.0809 | (see left) | 1.80518 | 25.43 | G4 |
| S10 | -364.95958 | -445.58341 | | | | | |
| | | | 6.1995 | (see left) | | | Aperture Stop(ST) |
| S11 | ∞ | (see left) | | | | | |
| | | | 22.0344 | 21.6574 | | | |
| S12* | -65.69581 | (see left) | | | | | |
| | | | 4.2909 | (see left) | 1.49140 | 57.82 | Rear Lens Unit(GrR) |
| S13* | -68.01370 | (see left) | | | | | |
| | | | 0.5298 | (see left) | | | |
| S14 | 101.03827 | (see left) | | | | | |
| | | | 14.0716 | (see left) | 1.49310 | 83.58 | Vd |
| S15 | -25.51650 | (see left) | | | | | |
| | | | 0.2000 | (see left) | | | |
| S16 | -41.58630 | (see left) | | | | | |
| | | | 2.5000 | (see left) | 1.80610 | 33.27 | |
| S17 | 40.11972 | (see left) | | | | | |
| | | | 0.0301 | (see left) | 1.51400 | 42.83 | |
| S18 | 40.11972 | (see left) | | | | | |
| | | | 12.8550 | (see left) | 1.62041 | 60.29 | |
| S19 | -57.10394 | (see left) | | | | | |
| | | | 0.5000 | (see left) | | | |
| S20 | 124.82930 | (see left) | | | | | |
| | | | 7.0560 | (see left) | 1.58913 | 61.11 | G9 |
| S21 | -73.93155 | (see left) | | | | | |
| | | | 11.6000 | (see left) | | | |
| S22 | ∞ | (see left) | | | | | |
| | | | 0.3000 | (see left) | 1.51680 | 64.20 | λ/4 Plate(P1) |
| S23 | ∞ | (see left) | | | | | |
| | | | 30.0000 | (see left) | 1.60942 | 63.20 | Prism(PT) |
| S24 | ∞ | (see left) | | | | | |
| | | | 2.6000 | (see left) | 1.51680 | 64.20 | λ/2 Plate(P2) |
| S25 | ∞ | (see left) | | | | | |

TABLE 9

Construction Data of Example 6

| Surface | CR | T | Nd | vd | Optical Element |
|---|---|---|---|---|---|
| S1* | 34.78310 | | | | |
| | | 5.2694 | 1.49140 | 57.82 | G1 |
| S2* | 18.19360 | | | | |
| | | 20.7075 | | | Front Lens Unit(GrF) |
| S3 | 116.78200 | | | | |
| | | 3.0000 | 1.71300 | 53.93 | G2 |
| S4 | 28.80180 | | | | |
| | | 7.3959 | | | |
| S5 | 42.78770 | | | | |
| | | 2.4884 | 1.74400 | 44.93 | |
| S6 | 29.50060 | | | | |
| | | — | | | |
| S7 | ∞ | | | | |
| | | — | 1.51680 | 64.20 | Prism(PR) |
| S8 | ∞ | | | | |
| | | — | | | |
| S9 | 52.65790 | | | | |
| | | 9.9184 | 1.71736 | 29.50 | |
| S10 | −135.28900 | | | | |
| | | 1.4014 | | | Aperture Stop(ST) |
| S11 | ∞ | | | | |
| | | 16.4596 | | | |
| S12* | −38.12400 | | | | |
| | | 4.8848 | 1.49140 | 57.82 | Rear Lens Unit(GrR) |
| S13* | −62.86300 | | | | |
| | | 0.4090 | | | |
| S14 | 152.99400 | | | | |
| | | 9.5787 | 1.49310 | 83.58 | Vd |
| S15 | −25.29400 | | | | |
| | | 0.4000 | | | |
| S16 | −43.80760 | | | | |
| | | 2.0000 | 1.71736 | 29.50 | |
| S17 | 31.92600 | | | | |
| | | 0.0300 | 1.51400 | 42.83 | |
| S18 | 31.92600 | | | | |
| | | 6.7062 | 1.48749 | 70.44 | |
| S19 | 173.84400 | | | | |
| | | 0.4000 | | | |
| S20 | 73.72350 | | | | |
| | | 12.7372 | 1.49310 | 83.58 | Vd |
| S21 | −35.78060 | | | | |
| | | 0.4000 | | | |
| S22 | 165.76600 | | | | |
| | | 8.0490 | 1.48749 | 70.44 | |
| S23 | −60.77960 | | | | |
| | | 1.6000 | | | |
| S24 | ∞ | | | | |
| | | 30.0000 | 1.60713 | 63.20 | Prism(PT) |
| S25 | ∞ | | | | |

TABLE 10

Coordinate Data of Example 5

| Surface | x | y | z | Rotation Angle (°) |
|---|---|---|---|---|
| S1 | 0 | 0 | 0 | 0 |
| S7 | 50.7541 | 0 | 0 | 1.7423 |
| S8 | 99.5945 | 0 | 0 | −0.3952 |
| S9 | 101.6357 | 0.2256 | 0 | 2.0778 |

TABLE 11

| Surface | Aspherical Surface Data of Example 5 | | | |
|---|---|---|---|---|
| S1 | ε | −6.80313 | A8 | −2.38268E-13 |
| | A4 | 8.42394E-07 | A10 | −2.60704E-17 |
| | A6 | 1.04468E-09 | A12 | 3.55340E-20 |

TABLE 11-continued

| Surface | Aspherical Surface Data of Example 5 | | | |
|---|---|---|---|---|
| S2 | ε | −1.34958 | A8 | 3.59810E-12 |
| | A4 | 7.78202E-06 | A10 | 7.65695E-16 |
| | A6 | −4.44667E-09 | A12 | −1.67847E-18 |
| S12 | ε | 1.24024 | A8 | −4.75670E-10 |
| | A4 | 0.000030185 | A10 | 5.70560E-13 |
| | A6 | −3.28734E-08 | A12 | 1.65635E-15 |
| S13 | ε | −0.770318 | A8 | −5.25688E-10 |
| | A4 | 4.64884E-05 | A10 | 1.15153E-12 |
| | A6 | 1.13929E-08 | A12 | −5.10772E-16 |

TABLE 12

Construction Data of Example 6

| Surface | CR | T | Nd | vd | Optical Element |
|---|---|---|---|---|---|
| S1* | 226.43953 | | | | |
| | | 4.5934 | 1.52200 | 52.20 | G1 |
| S2* | 47.14913 | | | | |
| | | 8.9870 | | | Front Lens Unit(GrF) |
| S3 | 77.49715 | | | | |
| | | 3.0000 | 1.74350 | 49.24 | G2 |
| S4 | 34.93511 | | | | |
| | | 15.2138 | | | |
| S5 | −576.25105 | | | | |
| | | 2.4645 | 1.57250 | 57.54 | |
| S6 | 32.18798 | | | | |
| | | 13.6355 | | | |
| S7 | ∞ | | | | |
| | | 47.3021 | 1.51680 | 64.20 | Prism(PR) |
| S8 | ∞ | | | | |
| | | 1.9875 | | | |
| S9 | 53.67744 | | | | |
| | | 7.0676 | 1.74000 | 31.72 | |
| S10 | −300.00813 | | | | |
| | | 20.5582 | | | Aperture Stop(ST) |
| S11 | ∞ | | | | |
| | | 2.8726 | | | |
| S12* | −22.86730 | | | | |
| | | 7.7983 | 1.52200 | 52.20 | Rear Lens Unit(GrR) |
| S13* | −25.80086 | | | | |
| | | 4.30704 | | | |
| S14 | 87.78013 | | | | |
| | | 10.0695 | 1.49310 | 83.58 | Vd |
| S15 | −24.56867 | | | | |
| | | 0.2000 | | | |
| S16 | −64.35401 | | | | |
| | | 3.0000 | 1.75690 | 31.79 | |
| S17 | 29.33747 | | | | |
| | | 0.0301 | 1.51400 | 42.83 | |
| S18 | 29.33747 | | | | |
| | | 6.9538 | 1.48749 | 70.44 | |
| S19 | 539.91599 | | | | |
| | | 3.5000 | | | |
| S20 | 391.75435 | | | | |
| | | 5.1013 | 1.62337 | 57.03 | |
| S21 | −47.92392 | | | | |
| | | 5.0000 | | | |
| S22 | ∞ | | | | |
| | | 1.3000 | 1.51680 | 64.20 | Polarizer Plate(P0) |
| S23 | ∞ | | | | |
| | | 28.7000 | | | |
| S24 | 59.15935 | | | | |
| | | 4.6800 | 1.60944 | 63.18 | Condenser(CL) |
| S25 | ∞ | | | | |
| | | 4.3300 | | | |
| S26 | ∞ | | | | |
| | | 1.2000 | 1.51680 | 64.20 | λ/2 Plate(P2) |
| S27 | ∞ | | | | |

TABLE 13

Aspherical Surface Data of Example 6

| Surface | | | | |
|---|---|---|---|---|
| S1 | ε | −7.12318 | A8 | 3.01414E-13 |
|  | A4 | 4.68114E-06 | A10 | 5.18964E-17 |
|  | A6 | −1.53772E-09 | A12 | −3.40095E-20 |
| S2 | ε | −3.48402 | A8 | −1.61980E-12 |
|  | A4 | 6.18262E-06 | A10 | −6.33520E-16 |
|  | A6 | 1.18789E-10 | A12 | 4.54960E-19 |
| S12 | ε | 0.39625 | A8 | 9.47898E-11 |
|  | A4 | 2.34424E-06 | A10 | −1.23149E-12 |
|  | A6 | 9.33724E-08 | A12 | 3.87810E-15 |
| S13 | ε | 0.21115 | A8 | 2.62754E-10 |
|  | A4 | 1.99132E-05 | A10 | −5.98660E-13 |
|  | A6 | 6.49040E-08 | A12 | 1.19404E-15 |

TABLE 14

Construction Data of Example 7

| Surface | CR | T | Nd | vd | Optical Element |
|---|---|---|---|---|---|
| S1 | 65.07726 | | | | |
|  |  | 5.0000 | 1.75450 | 51.57 | G1 |
| S2 | 40.82868 | | | | |
|  |  | 11.0719 | | | Front Lens Unit(GrF) |
| S3 | 67.43961 | | | | |
|  |  | 5.0000 | 1.75450 | 51.57 | G2 |
| S4 | 31.99144 | | | | |
|  |  | 11.3907 | | | |
| S5* | 149.13687 | | | | |
|  |  | 5.0000 | 1.49300 | 58.34 | |
| S6* | 29.08620 | | | | |
|  |  | 11.0000 | | | |
| S7 | ∞ | | | | |
|  |  | 60.0000 | 1.51680 | 64.20 | Prism(PR) |
| S8 | ∞ | | | | |
|  |  | 6.0000 | | | |
| S9 | −353.78193 | | | | |
|  |  | 8.8647 | 1.85 | 40.04 | |
| S10 | 51.36534 | | | | |
|  |  | 1.9992 | | | |
| S11 | 119.32491 | | | | |
|  |  | 4.6297 | 1.54072 | 47.20 | Rear Lens Unit(GrR) |
| S12 | −76.29051 | | | | |
|  |  | 0.1000 | | | |
| S13 | 36.70448 | | | | |
|  |  | 9.9331 | 1.80518 | 25.43 | |
| S14 | −1019.09789 | | | | |
|  |  | 17.9592 | | | Aperture Stop(ST) |
| S15 | ∞ | | | | |
|  |  | 1.6196 | | | |
| S16 | −33.93368 | | | | |
|  |  | 3.0000 | 1.80518 | 25.43 | |
| S17 | 30.40619 | | | | |
|  |  | 0.0300 | 1.51400 | 42.83 | |
| S18 | 30.40619 | | | | |
|  |  | 3.0000 | 1.51680 | 64.20 | |
| S19 | 165.81411 | | | | |
|  |  | 0.1000 | | | |
| S20* | 45.09654 | | | | |
|  |  | 10.0000 | 1.49300 | 58.34 | |
| S21* | −43.44632 | | | | |
|  |  | 3.5965 | | | |
| S22 | −14442.51878 | | | | |
|  |  | 9.0000 | 1.49310 | 83.58 | Vd |
| S23 | −25.91728 | | | | |
|  |  | 46.0000 | | | |
| S24 | 57.58558 | | | | |
|  |  | 5.0000 | 1.62041 | 60.29 | Condenser(CL) |
| S25 | ∞ | | | | |

TABLE 15

Aspherical Surface Data of Example 7

| Surface | | | | |
|---|---|---|---|---|
| S5 | ε | 1.00000 | A8 | 1.35490E-11 |
|  | A4 | 1.34020E-05 | A10 | −5.56518E-15 |
|  | A6 | −1.86749E-08 | A12 | — |
| S6 | ε | 0.31662378 | A8 | −7.90765E-12 |
|  | A4 | 7.42671E-06 | A10 | 2.31146E-14 |
|  | A6 | −2.12232E-08 | A12 | −1.17501E-17 |
| S20 | ε | 1.00000 | A8 | −3.96264E-11 |
|  | A4 | 4.15417E-06 | A10 | 5.78079E-14 |
|  | A6 | 2.35790E-08 | A12 | — |
| S21 | ε | 1.00000 | A8 | 3.84976E-11 |
|  | A4 | 1.89816E-05 | A10 | −7.01516E-14 |
|  | A6 | 3.64673E-08 | A12 | — |

TABLE 16

Data Corresponding to Conditional Formulae and Other Data

| Example | Size | (1) f | FNO | ω | (2) etc. D1/f | D2/f | (4) (Ng-Nf)/ (Nf-Nc) | (5) etc. ffa | fra | \|-ffa /fra\| |
|---|---|---|---|---|---|---|---|---|---|---|
| 1 | — | 13.0264 | 2.5 | 50.50 | 4.332 | 2.407 | 0.539288 | −78.473 | −593.265 | 0.132 |
| 2 | — | 13.2400 | 2.5 | 50.62 | 5.347 | 2.266 | 0.539288 | −88.116 | −848.390 | 0.104 |
| 3 | 50 | 13.1260 | 2.4 | 50.00 | 5.301 | 2.281 | 0.539288 | −111.458 | −9975.853 | 0.011 |
|  | 40 | 13.0720 | 2.4 | 50.00 | 5.280 | 2.270 | 0.539000 | −111.458 | −9975.853 | 0.011 |
| 4 | 50 | 13.1000 | 2.8 | 50.00 | 3.941 | 3.036 | 0.539288 | −117.179 | −10049.107 | 0.012 |
|  | 40 | 13.1570 | 2.8 | 50.00 | 3.950 | 3.040 | 0.539000 | −117.179 | −10049.107 | 0.012 |
| 5 | — | 11.7800 | 2.5 | 56.50 | 3.915 | 2.527 | 0.539288 | −86.396 | −210.088 | 0.411 |
| 6 | — | 13.0833 | 2.5 | 50.44 | 3.575 | 2.641 | 0.539288 | −114.569 | −4380.724 | 0.026 |
| 7 | — | 13.3572 | 2.5 | 50.32 | 4.558 | 3.444 | 0.539288 | −74.315 | 46.623 | 1.594 |

TABLE 17

Angle Data (°)

| Example | θ1 Maximum 50-inch | θ1 Maximum 40-inch | θ2 S1 | θ2 S2 | θ2 S3 | θ2 S4 | θ2 S5 | θ2 S6 | θ3 |
|---|---|---|---|---|---|---|---|---|---|
| 1 | 0.06 | — | 42.9 | 38.0 | 80.0 | 35.3 | — | — | 108.8 |
| 2 | 0.42 | — | 50.3 | 29.3 | 63.6 | 29.3 | 57.8 | 63.3 | 120.0 |
| 3 | 0.36 | 0.41 | 52.1 | 50.2 | 56.9 | 38.5 | 84.0 | 46.4 | 108.4 |
| 4 | 0.25 | 0.35 | 50.0 | 49.0 | 60.9 | 38.5 | 78.2 | 46.5 | 112.3 |
| 5 | 0.08 | — | 35.0 | 35.0 | 74.4 | 35.6 | 58.0 | 45.8 | 83.0 |
| 6 | 0.37 | — | 50.0 | 54.8 | 63.9 | 39.0 | — | 47.0 | 109.7 |
| 7 | 0.57 | — | 45.0 | 26.8 | 57.0 | 26.5 | 74.1 | 83.0 | 110.0 |

What is claimed is:

1. A projection optical system that, by using projection light emanating from a light valve illuminated by illumination light, projects an enlarged image of an image displayed on the light valve onto a screen, comprising, from a conjugate enlargement side:

a front lens unit having a negative optical power as a whole and including at least one aspherical surface, the front lens unit having a first lens element disposed at a conjugate-enlargement-side end thereof and having a second lens element disposed on a conjugate reduction side of the first lens element, the first and second lens elements both having a negative optical power;

optical path turning means, including a reflecting surface, for turning a light path of light emanating from the front lens unit;

a rear lens unit having a positive optical power as a whole and including at least one aspherical surface, the rear lens unit including a third lens element made of an anomalous dispersion material and having a positive optical power; and projection light preparing means disposed between the rear lens unit and the light valve and having at least one of a function of separating the illumination light and the projection light and a function of integrating together light of different colors, wherein a center of the light valve is not located on an optical axis of the rear lens unit, and wherein the following conditions are fulfilled:

$$48<\omega<60 \qquad (1)$$

$$3<D1/f<7 \qquad (2)$$

$$Vd>75 \qquad (3)$$

$$0.52<(Ng-Nf)/(Nf-Nc)<0.56 \qquad (4)$$

where

- ω represents a maximum angle of view (°);
- D1 represents a turning aerial interval (an optical path length, as converted on an air basis, from a most conjugate-reduction-side surface of the front lens unit to a most conjugate-enlargement-side surface of the rear lens unit);
- f represents a focal length of the entire projection optical system;
- Vd represents an Abbe number of the anomalous dispersion material;
- Ng represents a refractive index of the anomalous dispersion material for a g-line;
- Nf represents a refractive index of the anomalous dispersion material for a f-line; and
- Nc represents a refractive index of the anomalous dispersion material for a c-line.

2. A projection optical system as claimed in claim 1, wherein the following condition is fulfilled:

$$-0.5<-ffa/fra<0.5 \qquad (5)$$

where

- ffa represents a focal length of a lens element having the aspherical surface included in the front lens unit; and
- fra represents a focal length of a lens element having the aspherical surface included in the rear lens unit.

3. A projection optical system as claimed in claim 1, further comprising:

a condenser lens disposed between the projection light preparing means and the light valve.

4. A projection optical system as claimed in claim 1, wherein a most conjugate-reduction-side lens element of the rear lens unit is composed solely of spherical surfaces.

5. A projection optical system as claimed in claim 1, wherein the first and second lens elements both have a negative meniscus shape convex to the conjugate enlargement side.

6. A projection optical system as claimed in claim 1, wherein a lens element having the aspherical surface included in the front lens unit is made of a plastic material.

7. A projection optical system as claimed in claim 1, wherein a lens element having the aspherical surface included in the rear lens unit is made of a plastic material.

8. A projection optical system as claimed in claim 1, wherein an optical axis of the front lens unit is optically decentered translationally relative to the optical axis of the rear lens unit.

9. A projection optical system as claimed in claim 1, wherein the optical path turning means is realized with a prism of which at least one surface is inclined relative to the optical axis of the rear lens unit.

10. A projection optical system as claimed in claim 1, wherein an optical axis of the front lens unit is optically tilted relative to the optical axis of the rear lens unit.

11. A projection optical system as claimed in claim 1, wherein the front lens unit is rotatable along a sphere having a center on an optical axis of the front lens unit.

12. A projection optical system as claimed in claim 1, wherein the rear lens unit includes a first focusing unit having a positive optical power which is moved along the optical axis to achieve focusing and a second focusing unit having a positive optical power which is moved along the optical axis to correct a focusing error produced as a result of the first focusing unit being moved.

13. A projection optical system that, by using projection light emanating from a light valve illuminated by illumination light, projects an enlarged image of an image displayed on the light valve onto a screen, comprising, from a conjugate enlargement side:

a front lens unit having a negative optical power as a whole and including at least one aspherical surface, the front lens unit having a first lens element disposed at a conjugate-enlargement-side end thereof and having a second lens element disposed on a conjugate reduction side of the first lens element, the first and second lens elements both having a negative optical power;

optical path turning means, including a reflecting surface, for turning a light path of light emanating from the front lens unit;

a rear lens unit having a positive optical power as a whole and including at least one aspherical surface; and projection light preparing means disposed between the rear lens unit and the light valve and having at least one of a function of separating the illumination light and the projection light and a function of integrating together light of different colors, wherein a center of the light valve is not located on an optical axis of the rear lens unit, and wherein the following conditions are fulfilled:

$$48 < \omega < 60 \tag{1}$$

$$3 < D1/f < 7 \tag{2}$$

$$-0.5 < -ffa/fra < 0.5 \tag{5}$$

where

| | |
|---|---|
| ω | represents a maximum angle of view (°); |
| D1 | represents a turning aerial interval (an optical path length, as converted on an air basis, from a most conjugate-reduction-side surface of the front lens unit to a most conjugate-enlargement-side surface of the rear lens unit); |
| f | represents a focal length of the entire projection optical system; |
| ffa | represents a focal length of a lens element having the aspherical surface included in the front lens unit; and |
| fra | represents a focal length of a lens element having the aspherical surface included in the rear lens unit. |

14. A projection optical system as claimed in claim 13, further comprising:

a condenser lens disposed between the projection light preparing means and the light valve.

15. A projection optical system as claimed in claim 13, wherein a most conjugate-reduction-side lens element of the rear lens unit is composed solely of spherical surfaces.

16. A projection optical system as claimed in claim 13, wherein the first and second lens elements both have a negative meniscus shape convex to the conjugate enlargement side.

17. A projection optical system as claimed in claim 13, wherein a lens element having the aspherical surface included in the front lens unit is made of a plastic material.

18. A projection optical system as claimed in claim 13, wherein a lens element having the aspherical surface included in the rear lens unit is made of a plastic material.

19. A projection optical system as claimed in claim 13, wherein an optical ax is of the front lens unit is optically decentered translationally relative to the optical axis of the rear lens unit.

20. A projection optical system as claimed in claim 13, wherein the optical path turning means is realized with a prism of which at least one surface is inclined relative to the optical axis of the rear lens unit.

21. A projection optical system as claimed in claim 13, wherein an optical axis of the front lens unit is optically tilted relative to the optical axis of the rear lens unit.

22. A projection optical system as claimed in claim 13, wherein the front lens unit is rotatable along a sphere having a center on an optical axis of the front lens unit.

23. A projection optical system as claimed in claim 13, wherein the rear lens unit includes a first focusing unit having a positive optical power which is moved along the optical axis to achieve focusing and a second focusing unit having a positive optical power which is moved along the optical axis to correct a focusing error produced as a result of the first focusing unit being moved.

24. A rear projection apparatus comprising:

a light valve for displaying an image;

a screen onto which the image displayed on the light valve is projected from behind; and a projection optical system that projects an enlarged image of the image displayed on the light valve onto the screen, wherein the projection optical system comprises, from a conjugate enlargement side:

a front lens unit having a negative optical power as a whole and including at least one aspherical surface, the front lens unit having a first lens element disposed at a conjugate-enlargement-side end thereof and having a second lens element disposed on a conjugate reduction side of the first lens element, the first and second lens elements both having a negative optical power;

optical path turning means, including a reflecting surface, for turning a light path of light emanating from the front lens unit;

a rear lens unit having a positive optical power as a whole and including at least one aspherical surface, the rear lens unit including a third lens element made of an anomalous dispersion material and having a positive optical power; and projection light preparing means disposed between the rear lens unit and the light valve and having at least one of a function of separating the illumination light and the projection light and a function of integrating together light of different colors, wherein a center of the light valve is not located on an optical axis of the rear lens unit, and wherein the following conditions are fulfilled:

$$48 < \omega < 60 \tag{1}$$

$$3 < D1/f < 7 \tag{2}$$

$$Vd > 75 \tag{3}$$

$$0.52 < (Ng-Nf)/(Nf-Nc) < 0.56 \tag{4}$$

where

| | |
|---|---|
| ω | represents a maximum angle of view (°); |
| Dl | represents a turning aerial interval (an optical path length, as converted on an air basis, from a most conjugate-reduction-side surface of the front lens unit to a most conjugate-enlargement-side surface of the rear lens unit); |

-continued

| | |
|---|---|
| f | represents a focal length of the entire projection optical system; |
| Vd | represents an Abbe number of the anomalous dispersion material; |
| Ng | represents a refractive index of the anomalous dispersion material for a g-line; |
| Nf | represents a refractive index of the anomalous dispersion material for a f-line; and |
| Nc | represents a refractive index of the anomalous dispersion material for a c-line. |

25. A rear projection apparatus comprising:
a light valve for displaying an image;
a screen onto which the image displayed on the light valve is projected from behind; and
a projection optical system that projects an enlarged image of the image displayed on the light valve onto the screen,
wherein the projection optical system comprises, from a conjugate enlargement side:
  a front lens unit having a negative optical power as a whole and including at least one aspherical surface, the front lens unit having a first lens element disposed at a conjugate-enlargement-side end thereof and having a second lens element disposed on a conjugate reduction side of the first lens element, the first and second lens elements both having a negative optical power;
  optical path turning means, including a reflecting surface, for turning a light path of light emanating from the front lens unit;
  a rear lens unit having a positive optical power as a whole and including at least one aspherical surface; and
  projection light preparing means disposed between the rear lens unit and the light valve and having at least one of a function of separating the illumination light and the projection light and a function of integrating together light of different colors,
wherein a center of the light valve is not located on an optical axis of the rear lens unit, and
wherein the following conditions are fulfilled:

$$48<\omega<60 \tag{1}$$

$$3<D1/f<7 \tag{2}$$

$$-0.5<-ffa/fra<0.5 \tag{5}$$

where

| | |
|---|---|
| ω | represents a maximum angle of view (°); |
| D1 | represents a turning aerial interval (an optical path length, as converted on an air basis, from a most conjugate-reduction-side surface of the front lens unit to a most conjugate-enlargement-side surface of the rear lens unit); |
| f | represents a focal length of the entire projection optical system; |
| ffa | represents a focal length of a lens element having the aspherical surface included in the front lens unit; and |
| fra | represents a focal length of a lens element having the aspherical surface included in the rear lens unit. |

* * * * *